United States Patent
Chen et al.

(10) Patent No.: US 11,096,016 B2
(45) Date of Patent: Aug. 17, 2021

(54) METHOD AND APPARATUS OF HANDLING INTEREST INDICATION IN A WIRELESS COMMUNICATION SYSTEM

(71) Applicant: ASUSTeK COMPUTER INC., Taipei (TW)

(72) Inventors: Wei-Yu Chen, Taipei (TW); Yu-Hsuan Guo, Taipei (TW); Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 178 days.

(21) Appl. No.: 15/861,834

(22) Filed: Jan. 4, 2018

(65) Prior Publication Data

US 2018/0199163 A1     Jul. 12, 2018

Related U.S. Application Data

(60) Provisional application No. 62/445,469, filed on Jan. 12, 2017.

(51) Int. Cl.
| | |
|---|---|
| H04W 4/06 | (2009.01) |
| H04W 72/04 | (2009.01) |
| H04W 72/12 | (2009.01) |
| H04L 5/00 | (2006.01) |
| H04W 72/00 | (2009.01) |
| H04W 48/14 | (2009.01) |
| H04W 48/10 | (2009.01) |
| H04W 36/00 | (2009.01) |

(52) U.S. Cl.
CPC .......... *H04W 4/06* (2013.01); *H04L 5/0037* (2013.01); *H04L 5/0091* (2013.01); *H04W 48/14* (2013.01); *H04W 72/005* (2013.01); *H04W 72/042* (2013.01); *H04W 72/1284* (2013.01); *H04W 36/0007* (2018.08); *H04W 36/0061* (2013.01); *H04W 48/10* (2013.01)

(58) Field of Classification Search
CPC ..... H04W 4/06; H04W 48/14; H04W 72/005; H04W 72/1284; H04W 72/042; H04W 36/0007; H04W 36/0061; H04W 48/10; H04L 5/0091; H04L 5/0037
See application file for complete search history.

(56) References Cited

U.S. PATENT DOCUMENTS 8,867,426 B2   10/2014   Chun
9,655,131 B2   5/2017    Lee
(Continued)

OTHER PUBLICATIONS

3GPP TS 36.331 V14.0.0 (Sep. 2016), 26 pages (Year: 2016).*

*Primary Examiner* — Alex Skripnikov
*Assistant Examiner* — Sharmin Chowdhury
(74) *Attorney, Agent, or Firm* — Skaar Ulbrich Macari, P.A.

(57) ABSTRACT

Method and apparatus for a user equipment (UE) operating in a serving cell is disclosed. The serving cell does not broadcast system information for broadcast or multicast. The UE transmits an interest indication for broadcast or multicast to the serving cell. The interest indication for broadcast or multicast includes at least some information associated with a broadcast or multicast service of interest. The UE receives the system information for broadcast or multicast from the serving cell after transmitting the interest indication for broadcast or multicast.

12 Claims, 13 Drawing Sheets

(56) References Cited

U.S. PATENT DOCUMENTS

| | | | |
|---|---|---|---|
| 2011/0243054 A1* | 10/2011 | Yi | H04W 72/121 |
| | | | 370/312 |
| 2014/0105095 A1 | 4/2014 | Lee | |
| 2014/0119265 A1* | 5/2014 | Shauh | H04W 4/06 |
| | | | 370/312 |
| 2015/0071160 A1* | 3/2015 | Zeng | H04W 24/10 |
| | | | 370/312 |
| 2015/0327299 A1* | 11/2015 | Koskinen | H04W 4/06 |
| | | | 370/329 |
| 2015/0365963 A1* | 12/2015 | Won | H04W 28/0268 |
| | | | 370/329 |
| 2016/0174181 A1 | 6/2016 | Fujishiro | |
| 2016/0234736 A1* | 8/2016 | Kubota | H04W 36/0083 |
| 2018/0035340 A1* | 2/2018 | Fujishiro | H04W 36/0007 |
| 2018/0124601 A1* | 5/2018 | Vutukuri | H04W 48/14 |
| 2018/0176962 A1* | 6/2018 | Wu | H04W 72/14 |
| 2019/0069220 A1* | 2/2019 | Kim | H04L 27/2613 |
| 2019/0223094 A1* | 7/2019 | Ingale | H04W 68/005 |
| 2019/0253956 A1* | 8/2019 | Fujishiro | H04W 48/14 |

* cited by examiner

METHOD AND APPARATUS OF HANDLING INTEREST INDICATION IN A WIRELESS COMMUNICATION SYSTEM

CROSS-REFERENCE TO RELATED APPLICATIONS

This application claims the benefit of U.S. Provisional Application Ser. No. 62/445,469, filed Jan. 12, 2017, and entitled "Method and Apparatus of Handling Interest Indication in a Wireless Communication System," the entirety of which is expressly incorporated herein by reference.

TECHNICAL FIELD

The subject disclosure relates generally to communications systems, and specifically to broadcast and multicast services provided by wireless communications systems.

BACKGROUND

The 3rd Generation Partnership Project (3GPP), which provides reference designs and identifies issues that require consideration and solutions for 5G, has identified many unresolved issues related to resource allocation, resource control and transmitting control channel information for 5G systems. Inventions presented in the subject disclosure provide numerous solutions to those issues, including, for example, efficiently generating and managing interest indications for broadcast and multicast services.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without limitation to any particular network environment or standard).

Figure 1:
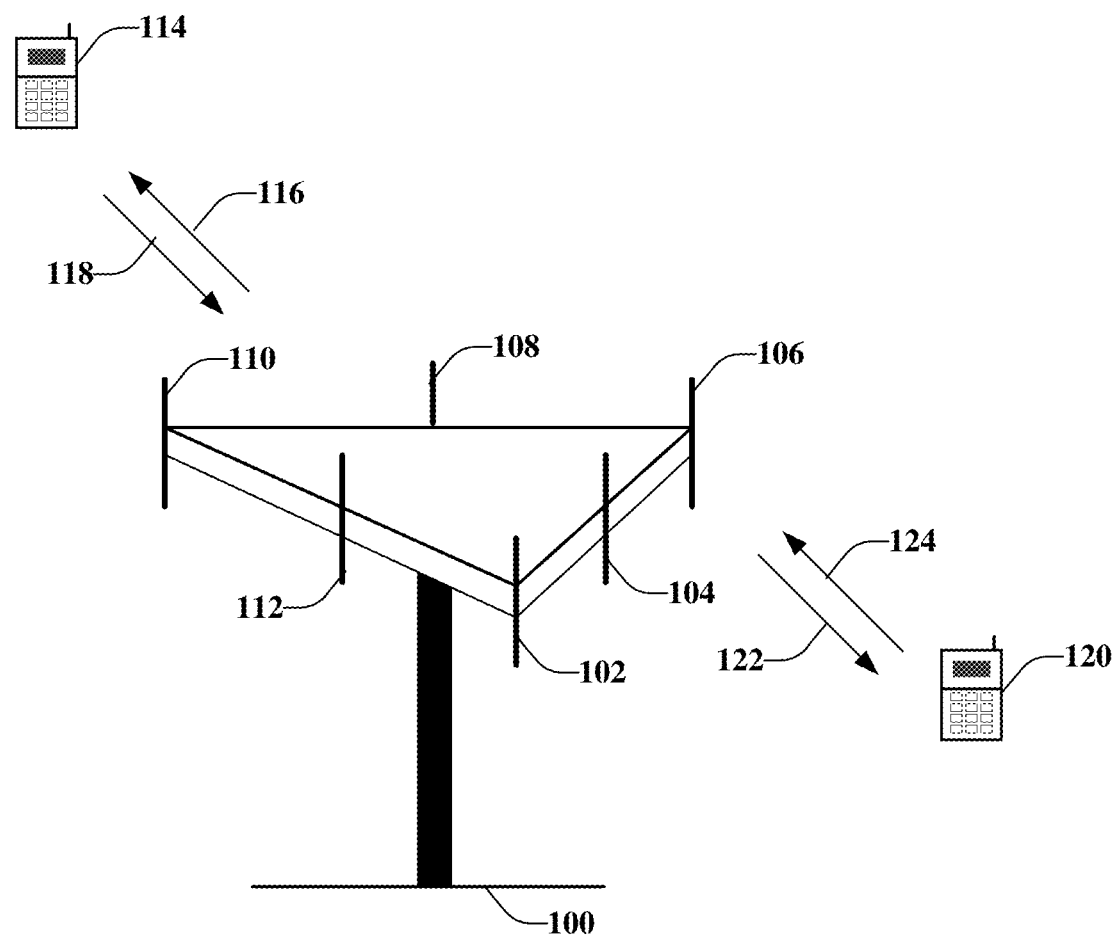
FIG. 1 illustrates an example, non-limiting wireless communication system, in accordance with one or more embodiments described herein.

Referring initially to FIG. 1, illustrated is an example, non-limiting wireless communications system, for transmission of services, e.g., Multimedia Broadcast Multicast Service (MBMS), in accordance with one or more embodiments described herein. The wireless communications system includes one or mobile devices (or UEs) 114 and 120, and a network node 100. UEs 114 and 120 can be in communication with network node 100 (e.g., eNodeB, eNB, gNodeB, gNB, network, cell, or other terminology). Antennas 102, 104, 106, 108, 110, and 112 transmit and receive communications between network node 100 and mobile devices, including UEs 114 and 120. It is noted that although various aspects are discussed with respect to two mobile devices and a single network node, the various aspects discussed herein can be applied to one or more mobile devices and/or one or more network nodes, and can be applied to different communications technologies, including Long Term Evolution (LTE, also referred to as 4G) standard, as specified in Third Generation Partnership Project (3GPP) Release 8 (December 2008) and subsequent releases, and 5G. Further, UEs 114 and 120 and/or the network node 100 can be in communication with other user equipment or mobile devices (not shown) and/or other network nodes (not shown). A "link" is a communications channel that connects two or more devices or nodes. Uplinks (UL) 118 and 120 refer to links used for the transmission of signals from UEs 114 and 120, respectively, to the network node 100. Downlinks (DL) 116 and 122 refer to links used for the transmission of signals from network node 100 to UEs 114 and 120, respectively.

In its development of 5G, the followup to LTE, the 3GPP has identified the delivery of broadcast or multicast services, e.g., MBMS, enhanced MBMS (eMBMS), as an area for improvement. The identified use cases and requirements are set forth in 3GPP TR 22.891 v.14.2.0 (September 2016), "3rd Generation Partnership Project; Technical Specification Group Services and System Aspects; Feasibility Study on New Services and Markets Technology Enablers; Stage 1 (Release 14)," which is incorporated by reference herein in its entirety, and quoted in part below:

"5.56 Broadcasting Support
5.56.1 Description
The system shall be able to support an enhanced form of MBMS that includes transmission of scheduled linear time Audio and Audio &Video programmes.
Pre-Conditions
Both Mobile and Network support an enhanced and flexible form of MBMS.
The Network has previously allocated MBMS resources.
Service Flows
1. A 3GPP device accesses an advertised MBMS service for broadcast information via a broadcast management system.
2. The mobile downloads the 3GPP resource group nomination (e.g. a channel code) for the cell that they are camped on for this broadcast channel from the broadcast management system.
3. The User keys in the channel code and starts receiving the broadcast channel subject to any authorisation.
Post-Conditions
Void.
5.57 Ad-Hoc Broadcasting
5.57.1 Description
MBMS and eMBMS have been defined in UMTS and LTE. However take-up has been poor. There are established terrestrial and satellite digital broadcast capabilities as well as evolving IP-TV content delivery systems whether linear or replay based. There is also a thriving video blog market via IP.
However, there is a demand for good quality event based content broadcasting over and above IP web pages and video snippets.
This use case proposes the ability to setup event based video content broadcasting, using a slice of the local or temporary 3GPP system in the environ of the event.
The event in this context may not be limited to purely sporting or entertainment, but may be a truly ad-hoc video broadcast that interested parties want to see based on a social web advert.
The envisaged difference for this use case for future 3GPP systems as compared to today is that the video content in this case, may be live and may not ever be stored on a video server in the network but may be only transmitted as a 'one-off' by either a broadcast organisation or an individual.
It is envisaged that in order to support this capability, a future mobile unit is operated to provide the video source content and then a DEDICATED resource budget is allocated in a given area or area(s) to enable multicast broadcast to other mobiles when their users elect to receive the content via a 3GPP Ad-Hoc MBMS service.
The benefits are that this is a dynamic way to efficiently broadcast video content on an ad-hoc basis as opposed to a user uploading and then each user separately downloading from a server or group communications point.
Pre-Conditions
The source broadcasting mobile has an internet connection over the 3GPP system and video camera/codec capabilities on their phone.
The recipient broadcast received mobiles have the ability to connect to an Ad-Hoc MBMS group.
Service Flows
1. A fixed or mobile 3GPP device user (individual and/or organisation) makes a request that they want to broadcast a video via an Ad-Hoc-MBMS social/operator provided broadcast request management system. The requester specifies the title, description, duration, format and 'scope' of the broadcast. Scope is specified in terms of locale and radius of desired broadcast coverage and mapped at the service centre to a single cell or number of cells that support the requested locale/range.
2. Alternatively the broadcast requester may be another type of device that is fixed connected to the internet and has access to the broadcast request management system.
3. The Ad-Hoc-MBMS application is operated by a host machine or sub-system which has a new interface towards the 3GPP system to make a request for ad-hoc resources for broadcasting the content. (N.B: this service could be chargeable).
4. The operator network element responsible for ad-hoc broadcast requests responds to the broadcaster request and if possible allocates local resources scheduled at a future time to broadcast the content as a 'broadcast opportunity window'.
5. The broadcast requester accepts the opportunity and the operator network element schedules MBMS resources for a given area scope specified in the original request.
6. The broadcast event is added to the ad-hoc broadcast channel programme guide (e.g. on a web page) that is part of the Ad-hoc MBMS service manager. Each broadcast event is given a code for the broadcast receiving devices to select to identify the MBMS resources to 'tune in to' to listen to the ad-hoc broadcast.
7. If the broadcast is for a single cell ad-hoc broadcast then, at the broadcast opportunity start time, the mobile broadcast requester broadcasts the ad-hoc broadcast content to the users in the locale directly, on the resources scheduled by the network earlier.
8. For multiple cell ad-hoc broadcasts, the cell that the broadcast requester is camped-on, also receives the broadcast and relays the stream to other adjacent cells listed in the scope request over the core network for rebroadcast on the resources identified at each adjacent cell in the list.
Post-Conditions
Resources operated to support the Ad-Hoc MBMS broadcast are released back into the pool for each cell where the ad-hoc broadcast was staged.

5.70 Broadcast/Multicast Services Using a Dedicated Radio Carrier 5.70.1 Description The massive growth in mobile broadband services over the last few years has caused regulatory bodies across the world to consider re-allocating some of the UHF spectrum, because of its superior propagation characteristics, for mobile broadband services. This could potentially cause displacement of smaller/rural TV broadcasters and make them look at alternate delivery models (e.g. channel sharing, delivery via mobile broadband, etc.). The NGMN white-paper [2] has considered that 5G systems could substitute or complement radio/television broadcast services.

As a potential new business opportunity, wireless operators could deploy an overlay 3GPP network using dedicated spectrum for the broadcast service to serve the customers affected by displacement of smaller broadcasters within a geographic area.

Alternatively, a new wireless entrant could deliver a stand-alone broadcast/multicast only service over a large geographic area by deploying less number of sites with greater coverage area.

Consider a use case where Operator A has deployed a 3GPP system using frequency f1 in urban geographic area where demand for the mobile broadband service, and therefore the capacity need is the highest. Operator A decides to introduce a new broadcast/multicast service either on its own or in partnership with another broadcast/multicast service provider. The service is expected to be made available over a much wider area than its existing 3GPP system.

Wireless operator A deploys an overlay over its existing 3GPP system to create a single frequency network with few sites, each covering a wide geographic area. In order to ensure it can accommodate a wide variety of broadcast/multicast content simultaneously, wireless operator A uses a dedicated frequency, f2, to deploy the broadcast/multicast service.

As a result of this overlay deployment users in urban area X can simultaneously receive existing broadband data services (on f1) as well as the new broadcast/multicast service (on f2). Users in suburban/rural areas Y and Z only receive the new broadcast/multicast service."

With respect to network operations, 3GPP TR 22.864 v.15.0.0 (September 2016), "3rd Generation Partnership Project; Technical Specification Group Services and System Aspects; Feasibility Study on New Services and Markets Technology Enablers—Network Operation; Stage 1 (Release 15)," which is incorporated by reference herein in its entirety, identifies use cases for 5G network operators. Section 5.1 provides exemplars of system flexibility desired for 5G, and is quoted in part below:

"5 Use Case Families 5.1 System Flexibility

Flexibility enabler 4: Flexible broadcast service

A flexible broadcast service (e.g., an enhanced form of MBMS), allows the users to receive linear time audio as well as audio and video programmes such as 4 k UHD. The user is able to select the expected broadcast program from the broadcaster's management system. Another new possible broadcast service is a truly ad-hoc video broadcast that interested parties want to see based on a social web advert, and the video content may be live and may not ever be stored on a video server in the network but may be only transmitted as a 'one-off' by either a broadcast organisation or an individual.

Today, 3GPP specifications do not allow a stand-alone deployment of a multicast/broadcast network. Additionally, the current implementation limits the radio resources that can be allocated for multicast/broadcast service to 60%. It also limits the coverage size of the radio base station to a relatively small value. In order to support a variety of linear video based services for the users, deployment of the next generation of multicast/broadcast capabilities will require significantly more flexibility than what is available in the current network in terms of configuration, resource allocation and network deployment to support broadcast/multicast services. The flexibility required encompasses allocation of resources, multicast/broadcast network design as well as simultaneous user access to unicast data and broadcast service."

In addition to 3GPP, the NGMN Alliance has examined possible use cases for 5G in the NGMN 5G White Paper v.1.0 (February 2015), which is incorporated by reference herein in its entirety. Section 3.2.1 articulates use cases for consideration in developing requirements for 5G architecture, and is quoted in part below:

"Broadcast-Like Services

While personalization of communication will lead to a reducing demand for legacy broadcast as deployed today, e.g. linear TV, the fully mobile and connected society will nonetheless need efficient distribution of information from one source to many destinations. These services may distribute content as done today (typically only downlink), but also provide a feedback channel (uplink) for interactive services or acknowledgement information. Both, real-time or non-real time services should be possible. Furthermore, such services are well suited to accommodate vertical industries' needs. These services are characterized by having a wide distribution which can be either geo-location focused or address-space focused (many end-users).

xviii. News and Information

Beyond 2020, receiving text/pictures, audio and video, everywhere and as soon as things happen (e.g., action or score in a football match) will be common. Customers in specific areas should simultaneously receive appropriate news and information regardless of the device they are using and their network connection.

xix. Local Broadcast-like Services

Local services will be active at a cell (compound) level with a reach of for example 1 to 20 km. Typical scenarios include stadium services, advertisements, voucher delivery, festivals, fairs, and congress/convention. Local emergency services can exploit such capabilities to search for missing people or in the prevention or response to crime (e.g. theft).

xx. Regional Broadcast-like Services

Broadcast-like services with a regional reach will be required, for example within 1 to 100 km. A typical scenario includes communication of traffic jam information. Regional emergency warnings can include disaster warnings. Unlike the legacy broadcast service, the feedback channel can be used to track delivery of the warning message to all or selected parties.

xxi. National Broadcast-like Services

National or even continental/world-reach services are interesting as a substitute or complementary to broadcast services for radio or television. Also vertical industries will benefit from national broadcast like services to upgrade/distribution of firmware. The automotive industry may leverage the acknowledgement broadcast capability to mitigate the need for recall campaigns. This requires software patches to be delivered in large scale, and successful updates to be confirmed and documented via the feedback channel. The post-2020 outlook, shown throughout the use cases above, is extremely broad in terms of variety of applications and variability of their performance attributes. The use case families shown earlier represent both enriched service categories and also prospects for numerous new services. Note that some may have overlaps."

In considering radio access technologies for 5G, a new Radio Resource Control (RRC) state, RRC_INACTIVE, has been proposed. In 3GPP TR 38.804 v.0.4.0 (November 2016), "3rd Generation Partnership Project; Technical Specification Group Radio Access Network; Study on New Radio Access Technology; Radio Interface Protocol Aspects (Release 14),", which is incorporated by reference herein in its entirety, and quoted in part below:

"5.2 Radio Interface Protocol Architecture

For NR, a technology of aggregating NR carriers is studied. Both lower layer aggregation like Carrier Aggregation (CA) for LTE (see [3]) and upper layer aggregation like DC are investigated. From layer 2/3 point of view, aggregation of carriers with different numerologies is supported in NR. Modelling aspects such as whether it is a single or multiple MAC entity is FFS.

5.5.3 System Information Handling

Figure 5:
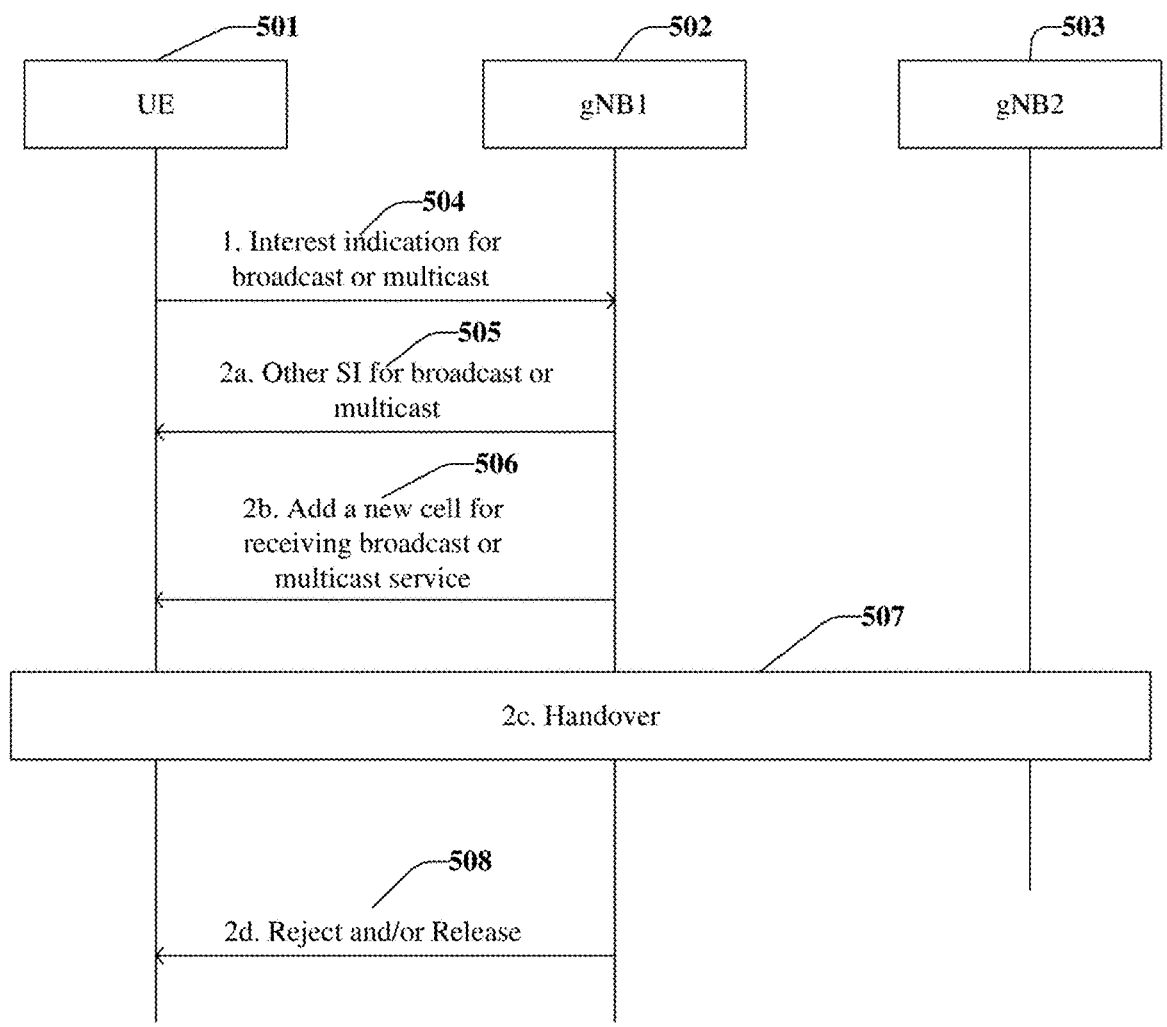
FIG. 5 illustrates another example, non-limiting flow diagram for responding to an interest indication for broadcast or multicast in accordance with one or more embodiments described herein.

System information is divided into minimum SI and other SI. Minimum SI is periodically broadcast. The minimum SI comprises basic information required for initial access to a cell and information for acquiring any other SI broadcast periodically or provisioned via on-demand basis. The other SI encompasses everything not broadcast in the minimum SI. The other SI may either be broadcast, or provisioned in a dedicated manner, either triggered by the network or upon request from the UE as illustrated in FIG. 5.5.3.1.2-1. For the other SI required by the UE, before the UE sends the other SI request the UE needs to know whether it is available in the cell and whether it is broadcast or not (e.g. by checking the minimum SI). The UE in RRC_IDLE or RRC_INACTIVE should be able to request the other SI without requiring a state transition. The other SI may be broadcast at configurable periodicity and for certain duration. PWS information can be classified into the other SI.

A.2 User Plane Aspects

The eNB should have means to control which logical channels the UE may map to which numerology and/or TTIs with variable duration. Details FFS (e.g. whether semi-static or dynamic, hard split/soft split, etc).

A UE can support multiple numerologies from a single cell. FFS whether this is modelled as 1 or multiple MAC entities.

A.4 RRC

With regards to RRC states related considerations (to be captured in sub-clause 5.5.2):

Study the introduction of a RAN controlled "state" characterised by, at least:

a) UEs in RAN controlled state should incur minimum signalling, minimise power consumption, minimise resource costs in the RAN/CN making it possible to maximise the number of UEs utilising (and benefiting from) this state.

b) Able to start data transfer with low delay (as required by RAN requirements).

FFS whether data transfer is by leaving the "state" or data transfer can occur within the "state".

FFS whether "state" translates to an RRC state.

Potential characteristics of the RAN controlled "state" for study:

a) The CN/RAN connection is maintained.

b) AS context stored in RAN.

c) Network knows the UE's location within an area and UE performs mobility within that area without notifying the network.

d) RAN can trigger paging of UEs which are in the RAN controlled "inactive state".

e) No dedicated resources.

RRC states with significantly overlapping characteristics should be avoided.

At least one RRC state for low activity should meet the NR control plane latency requirement and must be capable of achieving comparable power efficiency to that of LTE's IDLE state.

One UE has only one NR RRC state at one time.

The connection (both CP and UP) between RAN and Core should be maintained in the "new state".

FFS whether the "new state" can be transparent to Core.

For the UE in the "new state", a RAN initiated notification procedure should be used to reach UE. And the notification related parameters should be configured by RAN itself.

FFS how the notification will be transmitted (e.g. via a beam, broadcast, etc.).

For the UE in the "new state", RAN should be aware whenever the UE moves from one "RAN-based notification area" to another.

FFS how CN location updates and RAN updates interact, if needed.

Agree that, in the 'new state' there will be a mechanism where the UE first transits to the full connected state where data transmission can occur.

RAN2 will study the possibility for the UE to perform data transmission without state transition from the 'new state' to be fully connected.

With regards to system information provisioning (to be captured in sub-clause 5.5.3):

Other mechanisms than periodic broadcast of system information should be studied during study item.

Agree on the terminology of Minimum SI (at least for purpose of the SI discussions).

Minimum SI needs to be broadcasted periodically.

Contents and format of minimum SI are FFS. Content will at least include information to support cell selection, for acquiring other SI, for accessing the cell.

FFS Whether all "cells"/TRPs periodically broadcast the minimum SI.

Agree on the terminology of Other SI where other SI comprises everything not broadcasted in minimum SI.

FFS Whether ETWS/CMAS like information would be considered as Other SI or Minimum SI.

Both network triggered and UE initiated mechanisms for Other SI delivery shall be further studied.

It is network decision whether other SI is broadcasted or delivered through UE-specific signalling."

In 5G, the new radio access technology (RAT), also known as New Radio (NR), includes requirements for supporting multimedia broadcast or multicast services, and possible requirements and scenarios are set out in 3GPP TR 38.913 v.14.0.0 (October 2016), "3rd Generation Partnership Project; Technical Specification Group Radio Access Network; Study on Scenarios and Requirements for Next Generation Access Technologies; (Release 14)," which is incorporated herein in its entirety. Section 9, which is quoted in part below, sets forth requirements relating to supplementary services:

"9.1 Multimedia Broadcast/Multicast Service

The new RAT shall support existing Multicast/Broadcast services (e.g. download, streaming, group communication, TV, etc.) and new services (e.g. V2X, etc).

The new RAT shall support dynamic adjustment of the Multicast/Broadcast area based on e.g. the user distribution or service requirements.

The new RAT shall support concurrent delivery of both unicast and Multicast/Broadcast services to the users.

The new RAT shall support efficient multiplexing with unicast transmissions in at least frequency domain and time domain.

The new RAT shall support static and dynamic resource allocation between Multicast/Broadcast and unicast; the new RAT shall in particular allow support of up to 100% of DL resources for Multicast/Broadcast (100% meaning a dedicated MBMS carrier).

The new RAT shall support Multicast/Broadcast network sharing between multiple participating MNOs, including the case of a dedicated MBMS network.

The new RAT shall make it possible to cover large geographical areas up to the size of an entire country in SFN mode with network synchronization and shall allow cell radii of up to 100 km if required to facilitate that objective. It shall also support local, regional and national broadcast areas.

The new RAT shall support Multicast/Broadcast services for fixed, portable and mobile UEs. Mobility up to 250 km/h shall be supported.

The new RAT shall leverage usage of RAN equipment (hard- and software) including e.g. multi-antenna capabilities (e.g. MIMO) to improve Multicast/Broadcast capacity and reliability.

The new RAT shall support Multicast/Broadcast services for mMTC devices."

While MBMS and eMBMS are defined in the technical specifications for LTE and its predecessor UMTS, adoption has been poor. A possible area of improvement in 5G NR, as well as in LTE, is in the transmission of interest indications for broadcast or multicast service to the eNB (LTE) or gNB (5G). In LTE, handling of MBMS interest indications is disclosed in 3GPP TS 36.331 v.14.0.0 (October 2016), "3rd Generation Partnership Project; Technical Specification Group Radio Access Network; Evolved Universal Terrestrial Radio Access (E-UTRA); Radio Resource Control (RRC); Protocol specification (Release 14)", which is incorporated by reference here in its entirety. It will be appreciated that, where features in LTE or UMTS are cited, e.g., MBMSInterestIndication, analogous or equivalent functionality (whether or not using the same nomenclature or terminology) may be applicable in NR within the scope of this disclosure. In LTE, broadcast or multicast technologies are discussed in at least the following, which are incorporated by reference herein in their entirety: 3GPP TS 22.146 v.13.0.0 (December 2015), "3rd Generation Partnership Project; Technical Specification Group Services and System Aspects; Multimedia Broadcast/Multicast Service (MBMS); Stage 1 (Release 13)"; 3GPP TS 22.246 v.13.0.0 (December 2015), "3rd Generation Partnership Project; Technical Specification Group Services and System Aspects; Multimedia Broadcast/Multicast (MBMS) user services; Stage 1 (Release 13)"; 3GPP TS 23.246 v.14.1.0 (December 2016), "3rd Generation Partnership Project; Technical Specification Group Services and System Aspects; Multimedia Broadcast/Multicast Service (MBMS); Architecture and functional description (Release 14)"; 3GPP TS 26.346 v.14.1.0 (December 2016), "3rd Generation Partnership Project; Technical Specification Group Services and System Aspects; Multimedia Broadcast/Multicast Service (MBMS); Protocols and codecs (Release 14)"; and 3GPP TR 36.890 v.13.0.0 (June 2015), "3rd Generation Partnership Project; Technical Specification Group Radio Access Network; Evolved Universal Terrestrial Radio Access (E-UTRA); Study on single-cell point-to-multipoint transmission for E-UTRA (Release 13)".

Section 6.3.1 of 3GPP TS 36.331 v.14.0.0, which is quoted in part below, defines certain system information blocks for handling RRC information:

"-SystemInformationBlockType2

The IE SystemInformationBlockType2 contains radio resource configuration information that is common for all UEs.

NOTE: UE timers and constants related to functionality for which parameters are provided in another SIB are included in the corresponding SIB.

SystemInformationBlockType2 Information Element

```
-- ASN1START
SystemInformationBlockType2 ::=  SEQUENCE {
    ...
    mbsfn-SubframeConfigList      MBSFN-SubframeConfigList    OPTIONAL, -- Need OR
    ...
    ...
MBSFN-SubframeConfigList ::=     SEQUENCE (SIZE (1..maxMBSF-Allocations)) OF MBSFN-SubframeConfig
```

SystemInformationBlockType2 field descriptions mbsfn-SubframeConfigList
Defines the subframes that are reserved for MBSFN in downlink.
NOTE 1.

-SystemInformationBlockType13

The IE SystemInformationBlockType13 contains the information required to acquire the MBMS control information associated with one or more MBSFN areas.

SystemInformationBlockType13 Information Element

```
-- ASN1START
SystemInformationBlockType13-r9 ::= SEQUENCE {
    mbsfn-AreaInfoList-r9          MBSFN-AreaInfoList-r9.
    notificationConfig-r9          MBMS-NotificationConfig-r9,
    lateNonCriticalExtension       OCTET STRING                OPTIONAL,
    ...
}
-- ASN1STOP?
```

| SystemInformationBlockType13 field descriptions |
|---|
| notificationConfig<br>Indicates the MBMS notification related configuration parameters. The UE shall ignore this field when dl-Bandwidth included in MasterInformationBlock is set to n6. |

-SystemInformationBlockType15
The IE SystemInformationBlockType15 contains the MBMS Service Area Identities (SAI) of the current and/or neighbouring carrier frequencies.

SystemInformationBlockType15 Information Element

```
-- ASN1START
SystemInformationBlockType15-r11 ::=     SEQUENCE {
    mbms-SAI-IntraFreq-r11              MBMS-SAI-List-r11            OPTIONAL,
    -- Need OR
    mbms-SAI-InterFreqList-r11          MBMS-SAI-InterFreqList-r11   OPTIONAL,
    -- Need OR
    lateNonCriticalExtension            OCTET STRING                 OPTIONAL,
    ...,
    [[  mbms-SAI-InterFreqList-v1140    MBMS-SAI-InterFreqList-v1140 OPTIONAL
    -- Cond InterFreq
    ]]
}
MBMS-SAI-List-r11 ::=                   SEQUENCE (SIZE (1..maxSAI-MBMS-r11)) OF MBMS-SAI-r11
MBMS-SAI-r11 ::=                        INTEGER (0..65535)
MBMS-SAI-InterFreqList-r11 ::=          SEQUENCE (SIZE (1..maxFreq)) OF MBMS-SAI-InterFreq-r11
MBMS-SAI-InterFreqList-v1140 ::=        SEQUENCE (SIZE (1..maxFreq)) OF MBMS-SAI-InterFreq-v1140
MBMS-SAI-InterFreq-r11 ::=              SEQUENCE {
    dl-CarrierFreq-r11                  ARFCN-ValueEUTRA-r9,
    mbms-SAI-List-r11                   MBMS-SAI-List-r11
}
MBMS-SAI-InterFreq-v1140 ::=            SEQUENCE {
    multiBandInfoList-r11               MultiBandInfoList-r11        OPTIONAL -- Need OR
}
-- ASN1STOP
```

| SystemInformationBlockType15 field descriptions |
| --- |
| mbms-SAI-InterFreqList
Contains a list of neighboring frequencies including additional bands, if any, that provide MBMS services and the corresponding MBMS SAIs.
mbms-SAI-IntraFreq
Contains the list of MBMS SAIs for the current frequency. A duplicate MBMS SAI indicates that this and all following SAIs are not offered by this cell but only by neighbour cells on the current frequency. For MBMS service continuity, the UE shall use all MBMS SAIs listed in mbms-SAI-IntraFreq to derive the MBMS frequencies of interest.
mbms-SAI-List
Contains a list of MBMS SAIs for a specific frequency.
multiBandInfoList
A list of additional frequency bands applicable for the cells participating in the MBSFN transmission. |

| Conditional presence | Explanation |
| --- | --- |
| InterFreq | The field is optionally present, need OR, if the mbms-SAI-InterFreqList-r11 is present. Otherwise it is not present. |

-SystemInformationBlockType20

The IE SystemInformationBlockType20 contains the information required to acquire the control information associated transmission of MBMS using SC-PTM.

SystemInformationBlockType20 Information Element

```
-- ASN1START
SystemInformationBlockType20-r13 ::=    SEQUENCE {
    sc-mcch-RepetionPeriod-r13          ENUMERATED {rf2, rf4, rf8, rf16, rf32, rf64, rf128,
rf256},
    sc-mcch-Offset-r13                  INTEGER (0..10),
    sc-mcch-FirstSubframe-r13           INTEGER (0..9),
    sc-mcch-duration-r13                INTEGER (2..9)  OPTIONAL,
    sc-mcch-ModificationPeriod-r13      ENUMERATED {rf2, rf4, rf8, rf16, rf32, rf64, rf128,
rf256},
                                        rf512, rf1024, r2048. rf4096, rf8192, rf16384, rf32768,
                                            rf65536},
    lateNonCriticalExtension            OCTET STRING    OPTIONAL,
    ...
}
-- ASN1STOP?
```

| SystemInformationBlockType20 field descriptions |
| --- |
| sc-mcch-ModificationPeriod
Defines periodically appearing boundaries, i.e. radio frames for which SFN mod sc-mcch-ModificationPeriod = 0. The contents of different transmissions of SC-MCCH information can only be different if there is at least one such boundary in-between them. Value rf2 corresponds to 2 radio frames, value rf4 corresponds to 4 radio frames and so on.
sc-mcch-duration
Indicates, starting from the subframe indicated by sc-mcch-FirstSubframe, the duration in subframes during which SC-MCCH may be scheduled in PDCCH sub-frames, see TS 36.321 [6]. Absence of this IE means that SC-MCCH is only scheduled in the subframe indicated by sc-mcch-FirstSubframe.
sc-mcch-Offset
Indicates, together with the sc-mcch-RepetitionPeriod, the radio frames in which SC-MCCH is scheduled i.e. SC-MCCH is scheduled in radio frames for which: SFN mod sc-mcch-RepetitionPeriod = sc-mcch-Offset.
sc-mcch-FirstSubframe
Indicates the first subframe in which SC-MCCH is scheduled
sc-mcch-RepetitionPeriod |

| SystemInformationBlockType20 field descriptions |
| --- |
| Defines the interval between transmissions of SC-MCCH information, in radio frames. Value rf2 corresponds to 2 radio frames, rf4 corresponds to 4 radio frames and so on." |

Section 5.8 of 3GPP TS 36.331 v.14.0.0, discusses MBMS, including handling of MBMS interest indications, and is quoted in part below:

"5.8.5 MBMS Interest Indication 5.8.5.1 General

Figure 13:
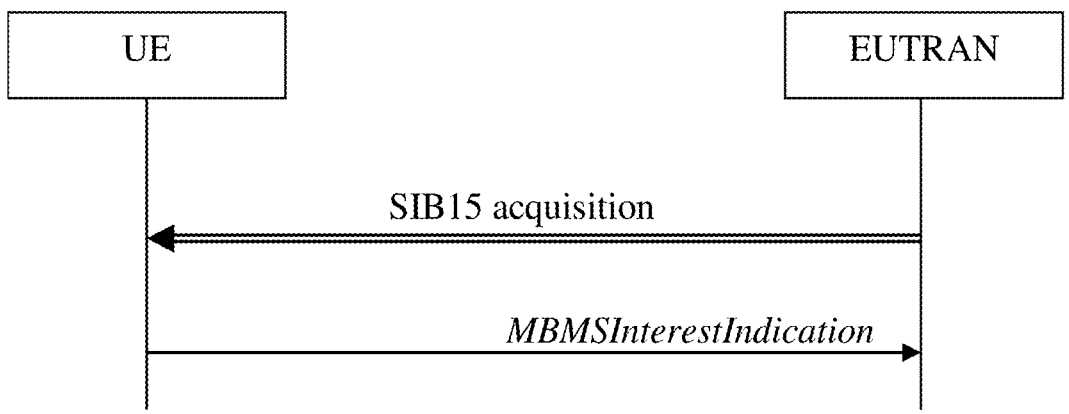
FIG. 13 is a reproduction of FIG. 5.8.5.1-1 from 3GPP TS 36.331 v.14.0.0 (October 2016), "3rd Generation Partnership Project; Technical Specification Group Radio Access Network; Evolved Universal Terrestrial Radio Access (E-UTRA); Radio Resource Control (RRC); Protocol specification (Release 14)"

[FIG. 13 is a Reproduction of FIG. 5.8.5.1-1]

The purpose of this procedure is to inform E-UTRAN that the UE is receiving or is interested to receive MBMS service(s) via an MRB or SC-MRB, and if so, to inform E-UTRAN about the priority of MBMS versus unicast reception.

5.8.5.2 Initiation

An MBMS or SC-PTM capable UE in RRC_CONNECTED may initiate the procedure in several cases including upon successful connection establishment, upon entering or leaving the service area, upon session start or stop, upon change of interest, upon change of priority between MBMS reception and unicast reception or upon change to a PCell broadcasting SystemInformationBlockType15.

Upon initiating the procedure, the UE shall:

1> if SystemInformationBlockType15 is broadcast by the PCell:
   2> ensure having a valid version of SystemInformationBlockType15 for the PCell;
   2> if the UE did not transmit an MBMSInterestIndication message since last entering RRC_CONNECTED state; or
   2> if since the last time the UE transmitted an MBMSInterestIndication message, the UE connected to a PCell not broadcasting SystemInformationBlockType15:
      3> if the set of MBMS frequencies of interest, determined in accordance with 5.8.5.3, is not empty:
         4> initiate transmission of the MBMSInterestIndication message in accordance with 5.8.5.4;
   2> else:
      3> if the set of MBMS frequencies of interest, determined in accordance with 5.8.5.3, has changed since the last transmission of the MBMSInterestIndication message; or
      3> if the prioritisation of reception of all indicated MBMS frequencies compared to reception of any of the established unicast bearers has changed since the last transmission of the MBMSInterestIndication message:
    4> initiate transmission of the MBMSInterestIndication message in accordance with 5.8.5.4;
NOTE: The UE may send an MBMSInterestIndication even when it is able to receive the MBMS services it is interested in i.e. to avoid that the network allocates a configuration inhibiting MBMS reception.
  3> else if SystemInformationBlockType20 is broadcast by the PCell:
    4> if since the last time the UE transmitted an MBMSInterestIndication message, the UE connected to a PCell not broadcasting SystemInformationBlockType20; or
    4> if the set of MBMS services of interest determined in accordance with 5.8.5.3a is different from mbms-Services included in the last transmission of the MBMSInterestIndication message;
5> initiate the transmission of the MBMSInterestIndication message in accordance with 5.8.5.4.

5.8.5.3 Determine MBMS Frequencies of Interest

The UE shall:
  1> consider a frequency to be part of the MBMS frequencies of interest if the following conditions are met:
    2> at least one MBMS session the UE is receiving or interested to receive via an MRB or SC-MRB is ongoing or about to start; and
  NOTE 1: The UE may determine whether the session is ongoing from the start and stop time indicated in the User Service Description (USD), see 3GPP TS 36.300 [9] or 3GPP TS 26.346 [57].
    2> for at least one of these MBMS sessions SystemInformationBlockType15 acquired from the PCell includes for the concerned frequency one or more MBMS SAIs as indicated in the USD for this session; and
  NOTE 2: The UE considers a frequency to be part of the MBMS frequencies of interest even though E-UTRAN may (temporarily) not employ an MRB or SC-MRB for the concerned session. I.e. the UE does not verify if the session is indicated on (SC-)MCCH
  NOTE 3: The UE considers the frequencies of interest independently of any synchronization state, e.g. [9, Annex J.1]
    2> the UE is capable of simultaneously receiving MRBs and/or is capable of simultaneously receiving SC-MRBs on the set of MBMS frequencies of interest, regardless of whether a serving cell is configured on each of these frequencies or not; and
    2> the supportedBandCombination the UE included in UE-EUTRA-Capability contains at least one band combination including the set of MBMS frequencies of interest;
  NOTE 4: Indicating a frequency implies that the UE supports SystemInformationBlockType13 or SystemInformationBlockType20 acquisition for the concerned frequency i.e. the indication should be independent of whether a serving cell is configured on that frequency.
  NOTE 5: When evaluating which frequencies it can receive simultaneously, the UE does not take into account the serving frequencies that are currently configured i.e. it only considers MBMS frequencies it is interested to receive.
  NOTE 6: The set of MBMS frequencies of interest includes at most one frequency for a given physical frequency. The UE only considers a physical frequency to be part of the MBMS frequencies of interest if it supports at least one of the bands indicated for this physical frequency in SystemInformationBlockType1 (for serving frequency) or SystemInformationBlockType15 (for neighbouring frequencies). In this case, E-UTRAN may assume the UE supports MBMS reception on any of the bands supported by the UE (i.e. according to supportedBandCombination).

5.8.5.3a Determine MBMS Services of Interest

The UE shall:
  1> consider a MBMS service to be part of the MBMS services of interest if the following conditions are met:
    2> the UE is SC-PTM capable; and
    2> the UE is receiving or interested to receive this service via an SC-MRB; and
    2> one session of this service is ongoing or about to start; and
    2> one or more MBMS SAIs in the USD for this service is included in SystemInformationBlockType15 acquired from the PCell for a frequency belonging to the set of MBMS frequencies of interest, determined according to 5.8.5.3.

5.8.5.4 Actions Related to Transmission of MBMSInterestIndication Message

The UE shall set the contents of the MBMSInterestIndication message as follows:
  1> if the set of MBMS frequencies of interest, determined in accordance with 5.8.5.3, is not empty:
    2> include mbms-FreqList and set it to include the MBMS frequencies of interest sorted by decreasing order of interest, using the EARFCN corresponding with freqBandIndicator included in SystemInformationBlockType1 (for serving frequency), if applicable, and the EARFCN(s) as included in SystemInformationBlockType15 (for neighbouring frequencies);
  NOTE 1: The EARFCN included in mbms-FreqList is merely used to indicate a physical frequency the UE is interested to receive i.e. the UE may not support the band corresponding to the included EARFCN (but it does support at least one of the bands indicated in system information for the concerned physical frequency).
    2> include mbms-Priority if the UE prioritises reception of all indicated MBMS frequencies above reception of any of the unicast bearers;
    2> if SystemInformationBlockType20 is broadcast by the PCell:
      3> include mbms-Services and set it to indicate the set of MBMS services of interest determined in accordance with 5.8.5.3a;
  NOTE 2: If the UE prioritises MBMS reception and unicast data cannot be supported because of congestion on the MBMS carrier(s), E-UTRAN may initiate release of unicast bearers. It is up to E-UTRAN implementation whether all bearers or only GBR bearers are released. E-UTRAN does not initiate re-establishment of the released unicast bearers upon alleviation of the congestion.

The UE shall submit the MBMSInterestIndication message to lower layers for transmission.

MBMSInterestIndication

The MBMSInterestIndication message is used to inform E-UTRAN that the UE is receiving/interested to receive or no longer receiving/interested to receive MBMS via an MRB or SC-MRB.

Signalling radio bearer: SRB1
RLC-SAP: AM
Logical channel: DCCH
Direction: UE to E-UTRAN MBMSInterestIndication Message

```
-- ASN1START
MBMSInterestIndication-r11 ::=         SEQUENCE{
    criticalExtensions                 CHOICE {
        c1                             CHOICE {
            interestIndication-r11         MBMSInterestIndication-r11-IEs,
            spare3 NULL, spare2 NULL, spare1 NULL
        },
        criticalExtensionsFuture       SEQUENCE{ }
    }
}
MBMSInterestIndication-r11-IEs ::=     SEQUENCE {
    mbms-FreqList-r11                  CarrierFreqListMBMS-r11              OPTIONAL,
    mbms-Priority-r11                  ENUMERATED {true}                    OPTIONAL,
    lateNonCriticalExtension           OCTET STRING                         OPTIONAL,
    nonCriticalExtension               MBMSInterestIndication-v1310-IEs     OPTIONAL
}
MBMSInterestIndication-v1310-IEs ::=   SEQUENCE {
    mbms-Services-r13                  MBMS-ServiceList-r13                 OPTIONAL,
    nonCriticalExtension               SEQUENCE { }                         OPTIONAL
}
--ASN1STOP
```

MBMSInterestIndication field descriptions mbms-FreqList
List of MBMS frequencies on which the UE is receiving or interested to receive MBMS via an MRB or SC-MRB.
mbms-Priority
Indicates whether the UE prioritises MBMS reception above unicast reception. The field is present (i.e. value true), if the UE prioritises reception of all listed MBMS frequencies above reception of any of the unicast bearers. Otherwise the field is absent.

MBMS-ServiceList
The IE MBMS-ServiceList provides the list of MBMS services which the UE is receiving or interested to receive.

MBMS-ServiceList Information Element

```
-- ASN1START
MBMS-ServiceList-r13 ::=    SEQUENCE (SIZE(0..maxMBMS-ServiceListPerUE-r13))
OF MBMS-ServiceInfo-r13
MBMS-ServiceInfo-r13 ::=        SEQUENCE {
    tmgi-r13                    TMGI-r9
}
--ASN1STOP"
```

Figure 14:
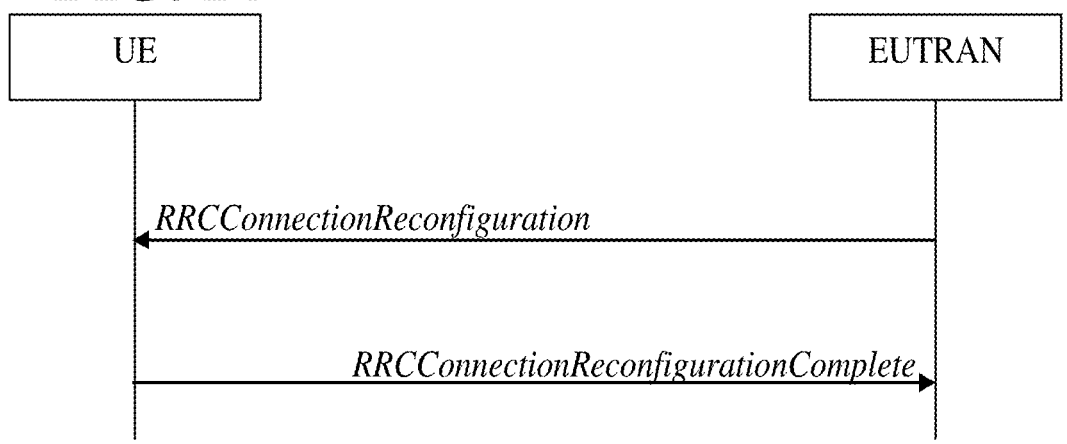
FIG. 14 is a reproduction of FIG. 5.3.5.1-1 from 3GPP TS 36.331 v.14.0.0 (October 2016), "3rd Generation Partnership Project; Technical Specification Group Radio Access Network; Evolved Universal Terrestrial Radio Access (E-UTRA); Radio Resource Control (RRC); Protocol specification (Release 14)"
Figure 15:
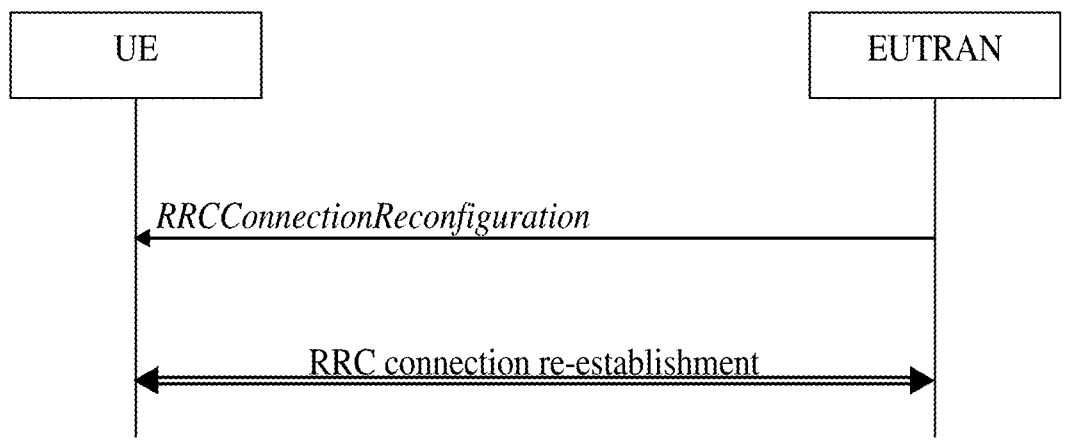
FIG. 15 is a reproduction of FIG. 5.3.5.1-2 from 3GPP TS 36.331 v.14.0.0 (October 2016), "3rd Generation Partnership Project; Technical Specification Group Radio Access Network; Evolved Universal Terrestrial Radio Access (E-UTRA); Radio Resource Control (RRC); Protocol specification (Release 14)".

Section 5.8 of 3GPP TS 36.331 v.14.0.0, discusses MBMS, including handling of MBMS interest indications, and is quoted in part below:
"5.3.5 RRC Connection Reconfiguration
5.3.5.1 General
    [FIG. 14 is a Reproduction of FIG. 5.3.5.1-1]
    [FIG. 15 is a Reproduction of FIG. 5.3.5.1-2]
The purpose of this procedure is to modify an RRC connection, e.g. to establish/modify/release RBs, to perform handover, to setup/modify/release measurements, to add/modify/release SCells. As part of the procedure, NAS dedicated information may be transferred from E-UTRAN to the UE.

5.3.5.2 Initiation
E-UTRAN may initiate the RRC connection reconfiguration procedure to a UE in RRC_CONNECTED. E-UTRAN applies the procedure as follows:
    the mobilityControlInfo is included only when AS-security has been activated, and SRB2 with at least one DRB are setup and not suspended;
    the establishment of RBs (other than SRB1, that is established during RRC connection establishment) is included only when AS security has been activated;
    the addition of SCells is performed only when AS security has been activated;
5.3.5.3 Reception of an RRCConnectionReconfiguration not Including the mobilityControlInfo by the UE
If the RRCConnectionReconfiguration message does not include the mobilityControlInfo and the UE is able to comply with the configuration included in this message, the UE shall:
    1> if this is the first RRCConnectionReconfiguration message after successful completion of the RRC connection re-establishment procedure:
        2> re-establish PDCP for SRB2 and for all DRBs that are established, if any;
        2> re-establish RLC for SRB2 and for all DRBs that are established, if any;
        2> if the RRCConnectionReconfiguration message includes the fullConfig:
            3> perform the radio configuration procedure as specified in 5.3.5.8;
        2> if the RRCConnectionReconfiguration message includes the radioResourceConfigDedicated:
            3> perform the radio resource configuration procedure as specified in 5.3.10;
    2> resume SRB2 and all DRBs that are suspended, if any;
    NOTE 1: The handling of the radio bearers after the successful completion of the PDCP re-establishment, e.g. the re-transmission of unacknowledged PDCP SDUs (as well as the associated status reporting), the handling of the SN and the HFN, is specified in TS 36.323 [8].

NOTE 2: The UE may discard SRB2 messages and data that it receives prior to completing the reconfiguration used to resume these bearers.

1> else:
   2> if the RRCConnectionReconfiguration message includes the radioResourceConfigDedicated:
      3> perform the radio resource configuration procedure as specified in 5.3.10;

NOTE 3: If the RRCConnectionReconfiguration message includes the establishment of radio bearers other than SRB1, the UE may start using these radio bearers immediately, i.e. there is no need to wait for an outstanding acknowledgment of the SecurityModeComplete message.

1> if the received RRCConnectionReconfiguration includes the sCellToReleaseList:
   2> perform SCell release as specified in 5.3.10.3a;
1> if the received RRCConnectionReconfiguration includes the sCellToAddModList:
   2> perform SCell addition or modification as specified in 5.3.10.3b;
1> if the received RRCConnectionReconfiguration includes the scg-Configuration; or
1> if the current UE configuration includes one or more split DRBs and the received RRCConnectionReconfiguration includes radioResourceConfigDedicated including drb-ToAddModList:
   2> perform SCG reconfiguration as specified in 5.3.10.10;
1> if the received RRCConnectionReconfiguration includes the systemInformationBlockType1Dedicated:
   2> perform the actions upon reception of the SystemInformationBlockType1 message as specified in 5.2.2.7;
1> if the RRCConnectionReconfiguration message includes the dedicatedInfoNASList:
   2> forward each element of the dedicatedInfoNASList to upper layers in the same order as listed;
1> if the RRCConnectionReconfiguration message includes the measConfig:
   2> perform the measurement configuration procedure as specified in 5.5.2;
1> perform the measurement identity autonomous removal as specified in 5.5.2.2a;
1> if the RRCConnectionReconfiguration message includes the otherConfig:
   2> perform the other configuration procedure as specified in 5.3.10.9;
1> if the RRCConnectionReconfiguration message includes the sl-DiscConfig or sl-CommConfig:
   2> perform the sidelink dedicated configuration procedure as specified in 5.3.10.15;
1> if the RRCConnectionReconfiguration message includes the sl-V2X-ConfigDedicated:
   2> perform the V2X sidelink communication dedicated configuration procedure as specified in 5.3.10.15a;
1> if the RRCConnectionReconfiguration message includes wlan-OffloadInfo:
   2> perform the dedicated WLAN offload configuration procedure as specified in 5.6.12.2;
1> if the RRCConnectionReconfiguration message includes rclwi-Configuration:
   2> perform the WLAN traffic steering command procedure as specified in 5.6.16.2;
1> if the RRCConnectionReconfiguration message includes lwa-Configuration:
   2> perform the LWA configuration procedure as specified in 5.6.14.2;
1> if the RRCConnectionReconfiguration message includes lwip-Configuration:
   2> perform the LWIP reconfiguration procedure as specified in 5.6.17.2;
1> upon RRC connection establishment, if UE does not need UL gaps during continuous uplink transmission:
   2> configure lower layers to stop using UL gaps during continuous uplink transmission in FDD for RRCConnectionReconfigurationComplete message and subsequent uplink transmission in RRC_CONNECTED except for UL transmissions as specified in TS36.211 [21];
1> submit the RRCConnectionReconfigurationComplete message to lower layers for transmission using the new configuration, upon which the procedure ends;

5.3.5.4 Reception of an RRCConnectionReconfiguration Including the mobilityControlInfo by the UE (Handover)

If the RRCConnectionReconfiguration message includes the mobilityControlInfo and the UE is able to comply with the configuration included in this message, the UE shall:
   1> stop timer T310, if running;
   1> stop timer T312, if running;
   1> start timer T304 with the timer value set to t304, as included in the mobilityControlInfo;
   1> stop timer T370, if running;
   1> if the carrierFreq is included:
      2> consider the target PCell to be one on the frequency indicated by the carrierFreq with a physical cell identity indicated by the targetPhysCellId;
   1> else:
      2> consider the target PCell to be one on the frequency of the source PCell with a physical cell identity indicated by the targetPhysCellId;
   1> start synchronising to the DL of the target PCell;

NOTE 1: The UE should perform the handover as soon as possible following the reception of the RRC message triggering the handover, which could be before confirming successful reception (HARQ and ARQ) of this message.

1> if BL UE or UE in CE:
   2> acquire the MasterInformationBlock in the target PCell;
1> reset MCG MAC and SCG MAC, if configured;
1> re-establish PDCP for all RBs that are established;

NOTE 2: The handling of the radio bearers after the successful completion of the PDCP re-establishment, e.g. the re-transmission of unacknowledged PDCP SDUs (as well as the associated status reporting), the handling of the SN and the HFN, is specified in TS 36.323 [8].

1> re-establish MCG RLC and SCG RLC, if configured, for all RBs that are established;
1> configure lower layers to consider the SCell(s) other than the PSCell, if configured, to be in deactivated state;
1> apply the value of the newUE-Identity as the C-RNTI;
1> if the RRCConnectionReconfiguration message includes the fullConfig:
   2> perform the radio configuration procedure as specified in 5.3.5.8;

1> configure lower layers in accordance with the received radioResourceConfigCommon;
1> configure lower layers in accordance with any additional fields, not covered in the previous, if included in the received mobilityControlInfo;
1> if the received RRCConnectionReconfiguration includes the sCellToReleaseList:
  2> perform SCell release as specified in 5.3.10.3a;
1> if the received RRCConnectionReconfiguration includes the scg-Configuration; or
1> if the current UE configuration includes one or more split DRBs and the received RRCConnectionReconfiguration includes radioResourceConfigDedicated including drb-ToAddModList:
  2> perform SCG reconfiguration as specified in 5.3.10.10;
1> if the RRCConnectionReconfiguration message includes the radioResourceConfigDedicated:
  2> perform the radio resource configuration procedure as specified in 5.3.10;
1> if the keyChangeIndicator received in the securityConfigHO is set to TRUE:
  2> update the $K_{eNB}$ key based on the $K_{ASME}$ key taken into use with the latest successful NAS SMC procedure, as specified in TS 33.401 [32];
1> else:
  2> update the $K_{eNB}$ key based on the current $K_{eNB}$ or the NH, using the nextHopChainingCount value indicated in the securityConfigHO, as specified in TS 33.401 [32];
1> store the nextHopChainingCount value;
1> if the securityAlgorithmConfig is included in the securityConfigHO:
  2> derive the $K_{RRCint}$ key associated with the integrityProtAlgorithm, as specified in TS 33.401 [32];
  2> if connected as an RN:
    3> derive the $K_{UPint}$ key associated with the integrityProtAlgorithm, as specified in TS 33.401 [32];
  2> derive the $K_{RRCenc}$ key and the $K_{UPenc}$ key associated with the cipheringAlgorithm, as specified in TS 33.401 [32];
1> else:
  2> derive the $K_{RRCint}$ key associated with the current integrity algorithm, as specified in TS 33.401 [32];
  2> if connected as an RN:
    3> derive the $K_{UPint}$ key associated with the current integrity algorithm, as specified in TS 33.401 [32];
  2> derive the $K_{RRCenc}$ key and the $K_{UPenc}$ key associated with the current ciphering algorithm, as specified in TS 33.401 [32];
1> configure lower layers to apply the integrity protection algorithm and the $K_{RRCint}$ key, i.e. the integrity protection configuration shall be applied to all subsequent messages received and sent by the UE, including the message used to indicate the successful completion of the procedure;
1> configure lower layers to apply the ciphering algorithm, the $K_{RRCenc}$ key and the $K_{UPenc}$ key, i.e. the ciphering configuration shall be applied to all subsequent messages received and sent by the UE, including the message used to indicate the successful completion of the procedure;
1> if connected as an RN:
  2> configure lower layers to apply the integrity protection algorithm and the $K_{UPint}$ key, for current or subsequently established DRBs that are configured to apply integrity protection, if any;
1> if the received RRCConnectionReconfiguration includes the sCellToAddModList:
  2> perform SCell addition or modification as specified in 5.3.10.3b;
1> if the received RRCConnectionReconfiguration includes the systemInformationBlockType1Dedicated:
  2> perform the actions upon reception of the SystemInformationBlockType1 message as specified in 5.2.2.7;
1> perform the measurement related actions as specified in 5.5.6.1;
1> if the RRCConnectionReconfiguration message includes the measConfig:
  2> perform the measurement configuration procedure as specified in 5.5.2;
1> perform the measurement identity autonomous removal as specified in 5.5.2.2a;
1> release reportProximityConfig and clear any associated proximity status reporting timer;
1> if the RRCConnectionReconfiguration message includes the otherConfig:
  2> perform the other configuration procedure as specified in 5.3.10.9;
1> if the RRCConnectionReconfiguration message includes the sl-DiscConfig or sl-CommConfig:
  2> perform the sidelink dedicated configuration procedure as specified in 5.3.10.15;
1> if the RRCConnectionReconfiguration message includes wlan-OffloadInfo:
  2> perform the dedicated WLAN offload configuration procedure as specified in 5.6.12.2;
1> release the LWA configuration, if configured, as described in 5.6.14.3;
1> release the LWIP configuration, if configured, as described in 5.6.17.3;
1> if the RRCConnectionReconfiguration message includes rclwi-Configuration:
  2> perform the WLAN traffic steering command procedure as specified in 5.6.16.2;
1> if the RRCConnectionReconfiguration message includes lwa-Configuration:
  2> perform the LWA configuration procedure as specified in 5.6.14.2;
1> if the RRCConnectionReconfiguration message includes lwip-Configuration:
  2> perform the LWIP reconfiguration procedure as specified in 5.6.17.2;
1> if the RRCConnectionReconfiguration message includes the sl-V2X-ConfigDedicated or mobilityControlInfoV2X:
  2> perform the V2X sidelink communication dedicated configuration procedure as specified in 5.3.10.15a;
1> set the content of RRCConnectionReconfiguration-Complete message as follows:
  2> if the UE has radio link failure or handover failure information available in VarRLF-Report and if the RPLMN is included in phren-IdentityList stored in VarRLF-Report:
    3> include rlf-InfoAvailable;
  2> if the UE has MBSFN logged measurements available for E-UTRA and if the RPLMN is included in plmn-IdentityList stored in VarLogMeasReport and if T330 is not running:
    3> include logMeasAvailableMBSFN;
  2> else if the UE has logged measurements available for E-UTRA and if the RPLMN is included in plmn-IdentityList stored in VarLogMeasReport:

3> include the logMeasAvailable;
2> if the UE has connection establishment failure information available in VarConnEstFailReport and if the RPLMN is equal to plmn-Identity stored in VarConnEstFailReport:
3> include connEstFailInfoAvailable;
1> submit the RRCConnectionReconfigurationComplete message to lower layers for transmission;
1> if MAC successfully completes the random access procedure:
2> stop timer T304;
2> apply the parts of the CQI reporting configuration, the scheduling request configuration and the sounding RS configuration that do not require the UE to know the SFN of the target PCell, if any;
2> apply the parts of the measurement and the radio resource configuration that require the UE to know the SFN of the target PCell (e.g. measurement gaps, periodic CQI reporting, scheduling request configuration, sounding RS configuration), if any, upon acquiring the SFN of the target PCell;
NOTE 3: Whenever the UE shall setup or reconfigure a configuration in accordance with a field that is received it applies the new configuration, except for the cases addressed by the above statements.
2> if the UE is configured to provide IDC indications:
3> if the UE has transmitted an InDeviceCoexIndication message during the last 1 second preceding reception of the RRCConnectionReconfiguration message including mobilityControlInfo:
4> initiate transmission of the InDeviceCoexIndication message in accordance with 5.6.9.3;
2> if the UE is configured to provide power preference indications:
3> if the UE has transmitted a UEAssistanceInformation message during the last 1 second preceding reception of the RRCConnectionReconfiguration message including mobilityControlInfo:
4> initiate transmission of the UEAssistanceInformation message in accordance with 5.6.10.3;
2> if SystemInformationBlockType15 is broadcast by the PCell:
3> if the UE has transmitted a MBMSInterestIndication message during the last 1 second preceding reception of the RRCConnectionReconfiguration message including mobilityControlInfo:
4> ensure having a valid version of SystemInformationBlockType15 for the PCell;
4> determine the set of MBMS frequencies of interest in accordance with 5.8.5.3;
4> determine the set of MBMS services of interest in accordance with 5.8.5.3a;
4> initiate transmission of the MBMSInterestIndication message in accordance with 5.8.5.4;
2> if SystemInformationBlockType18 is broadcast by the target PCell; and the UE transmitted a SidelinkUEInformation message indicating a change of sidelink communication related parameters relevant in target PCell (i.e. change of commRxInterestedFreq or commTxResourceReq, commTxResourceReqUC if SystemInformationBlockType18 includes commTxResourceUC-ReqAllowed or commTxResourceInfoReqRelay if PCell broadcasts SystemInformationBlockType19 including discConfigRelay) during the last 1 second preceding reception of the RRCConnectionReconfiguration message including mobilityControlInfo; or
2> if SystemInformationBlockType19 is broadcast by the target PCell; and the UE transmitted a SidelinkUEInformation message indicating a change of sidelink discovery related parameters relevant in target PCell (i.e. change of discRxInterest or discTxResourceReq, discTxResourceReqPS if SystemInformationBlockType19 includes discConfigPS or discRxGapReq or discTxGapReq if the UE is configured with gapRequestsAllowedDedicated set to true or if the UE is not configured with gapRequestsAllowedDedicated and SystemInformationBlockType19 includes gapRequestsAllowedCommon) during the last 1 second preceding reception of the RRCConnectionReconfiguration message including mobilityControlInfo:
3> initiate transmission of the SidelinkUEInformation message in accordance with 5.10.2.3;
2> the procedure ends;
NOTE 4: The UE is not required to determine the SFN of the target PCell by acquiring system information from that cell before performing RACH access in the target PCell, except for BL UEs or UEs in CE.

5.3.5.8 Radio Configuration Involving Full Configuration Option

The UE shall:
1> release/clear all current dedicated radio configurations except the MCG C-RNTI, the MCG security configuration and the PDCP, RLC, logical channel configurations for the RBs and the logged measurement configuration;
NOTE 1: Radio configuration is not just the resource configuration but includes other configurations like MeasConfig and OtherConfig.
1> if the RRCConnectionReconfiguration message includes the mobilityControlInfo:
2> release/clear all current common radio configurations;
2> use the default values specified in 9.2.5 for timer T310, T311 and constant N310, N311;
1> else:
2> use values for timers T301, T310, T311 and constants N310, N311, as included in ue-TimersAndConstants received in SystemInformationBlockType2;
1> apply the default physical channel configuration as specified in 9.2.4;
1> apply the default semi-persistent scheduling configuration as specified in 9.2.3;
1> apply the default MAC main configuration as specified in 9.2.2;
1> if the UE is a NB-IoT UE; or
1> for each srb-Identity value included in the srb-ToAddModList (SRB reconfiguration):
2> apply the specified configuration defined in 9.1.2 for the corresponding SRB;
2> apply the corresponding default RLC configuration for the SRB specified in 9.2.1.1 for SRB1 or in 9.2.1.2 for SRB2;
2> apply the corresponding default logical channel configuration for the SRB as specified in 9.2.1.1 for SRB1 or in 9.2.1.2 for SRB2;
NOTE 2: This is to get the SRBs (SRB1 and SRB2 for handover and SRB2 for reconfiguration after reestablishment) to a known state from which the reconfiguration message can do further configuration.

1> for each eps-BearerIdentity value included in the drb-ToAddModList that is part of the current UE configuration:
  2> release the PDCP entity;
  2> release the RLC entity or entities;
  2> release the DTCH logical channel;
  2> release the drb-identity;
NOTE 3: This will retain the eps-bearerIdentity but remove the DRBs including drb-identity of these bearers from the current UE configuration and trigger the setup of the DRBs within the AS in Section 5.3.10.3 using the new configuration. The eps-bearerIdentity acts as the anchor for associating the released and re-setup DRB. In the AS the DRB re-setup is equivalent with a new DRB setup (including new PDCP and logical channel configurations).
1> for each eps-BearerIdentity value that is part of the current UE configuration but not part of the drb-ToAddModList:
  2> perform DRB release as specified in 5.3.10.2;

5.3.10 Radio Resource Configuration
5.3.10.0 General
The UE shall:
1> if the received radioResourceConfigDedicated includes the srb-ToAddModList:
  2> perform the SRB addition or reconfiguration as specified in 5.3.10.1;
1> if the received radioResourceConfigDedicated includes the drb-ToReleaseList:
  2> perform DRB release as specified in 5.3.10.2;
1> if the received radioResourceConfigDedicated includes the drb-ToAddModList:
  2> perform DRB addition or reconfiguration as specified in 5.3.10.3;
1> if the received radioResourceConfigDedicated includes the mac-MainConfig:
  2> perform MAC main reconfiguration as specified in 5.3.10.4;
1> if the received radioResourceConfigDedicated includes sps-Config:
  2> perform SPS reconfiguration according to 5.3.10.5;
1> if the received radioResourceConfigDedicated includes the physicalConfigDedicated:
  2> reconfigure the physical channel configuration as specified in 5.3.10.6.
1> if the received radioResourceConfigDedicated includes the rlf-TimersAndConstants:
  2> reconfigure the values of timers and constants as specified in 5.3.10.7;
1> if the received radioResourceConfigDedicated includes the measSubframePatternPCell:
  2> reconfigure the time domain measurement resource restriction for the serving cell as specified in 5.3.10.8;
1> if the received radioResourceConfigDedicated includes the naics-Info:
  2> perform NAICS neighbour cell information reconfiguration for the PCell as specified in 5.3.10.13;
1> if the received RadioResourceConfigDedicatedPSCell includes the naics-Info:
  2> perform NAICS neighbour cell information reconfiguration for the PSCell as specified in 5.3.10.13;
1> if the received RadioResourceConfigDedicatedSCell-r10 includes the naics-Info:
  2> perform NAICS neighbour cell information reconfiguration for the SCell as specified in 5.3.10.13;

5.3.10.3a SCell Release
The UE shall:
1> if the release is triggered by reception of the sCellToReleaseList or the sCellToReleaseListSCG:
  2> for each sCellIndex value included either in the sCellToReleaseList or in the sCellToReleaseListSCG:
    3> if the current UE configuration includes an SCell with value sCellIndex:
      4> release the SCell;
1> if the release is triggered by RRC connection re-establishment:
  2> release all SCells that are part of the current UE configuration;

5.3.10.3b SCell Addition/Modification
The UE shall:
1> for each sCellIndex value included either in the sCellToAddModList or in the sCellToAddModList-SCG that is not part of the current UE configuration (SCell addition):
  2> add the SCell, corresponding to the cellIdentification, in accordance with the radioResourceConfigCommonSCell and radioResourceConfigDedicatedSCell, both included either in the sCellToAddModList or in the sCellToAddModList-SCG;
  2> configure lower layers to consider the SCell to be in deactivated state;
  2> for each measId included in the measIdList within VarMeasConfig:
    3> if SCells are not applicable for the associated measurement; and
    3> if the concerned SCell is included in cellsTriggeredList defined within the VarMeasReportList for this measId:
      4> remove the concerned SCell from cellsTriggeredList defined within the VarMeasReportList for this measId;
1> for each sCellIndex value included either in the sCellToAddModList or in the sCellToAddModList-SCG that is part of the current UE configuration (SCell modification):
  2> modify the SCell configuration in accordance with the radioResourceConfigDedicatedSCell, included either in the sCellToAddModList or in the sCellToAddModListSCG;

5.3.10.3c PSCell Addition or Modification
The UE shall:
1> if the PSCell is not part of the current UE configuration (i.e. PSCell addition):
  2> add the PSCell, corresponding to the cellIdentification, in accordance with the received radioResourceConfigCommonPSCell and radioResourceConfigDedicatedPSCell;
  2> configure lower layers to consider the PSCell to be in activated state;
1> if the PSCell is part of the current UE configuration (i.e. PSCell modification):
  2> modify the PSCell configuration in accordance with the received radioResourceConfigDedicatedPSCell;

5.3.10.10 SCG Reconfiguration
The UE shall:
1> if the received scg-Configuration is set to release or includes the mobilityControlInfoSCG (i.e. SCG release/change):
  2> if mobilityControlInfo is not received (i.e. SCG release/change without HO):
    3> reset SCG MAC, if configured;

3> for each drb-Identity value that is part of the current UE configuration:
    4> if the DRB indicated by drb-Identity is an SCG DRB:
5> re-establish the PDCP entity and the SCG RLC entity or entities;
    4> if the DRB indicated by drb-Identity is a split DRB:
5> perform PDCP data recovery and re-establish the SCG RLC entity;
    4> if the DRB indicated by drb-Identity is an MCG DRB; and
    4> drb-ToAddModListSCG is received and includes the drb-Identity value, while for this entry drb-Type is included and set to scg (i.e. MCG to SCG):
5> re-establish the PDCP entity and the MCG RLC entity or entities;
    3> configure lower layers to consider the SCG SCell(s), except for the PSCell, to be in deactivated state;
1> if the received scg-Configuration is set to release:
    2> release the entire SCG configuration, except for the DRB configuration (i.e. as configured by drb-ToAddModListSCG);
    2> if the current UE configuration includes one or more split or SCG DRBs and the received RRCConnectionReconfiguration message includes radioResourceConfigDedicated including drb-ToAddModList:
        3> reconfigure the SCG or split DRB by drb-ToAddModList as specified in 5.3.10.12;
    2> stop timer T313, if running;
    2> stop timer T307, if running;
1> else:
    2> if the received scg-ConfigPartMCG includes the scg-Counter:
        3> update the S-$K_{eNB}$ key based on the $K_{eNB}$ key and using the received scg-Counter value, as specified in TS 33.401 [32];
        3> derive the $K_{UPenc}$ key associated with the cipheringAlgorithmSCG included in mobilityControlInfoSCG within the received scg-ConfigPartSCG, as specified in TS 33.401 [32];
        3> configure lower layers to apply the ciphering algorithm and the $K_{UPenc}$ key;
    2> if the received scg-ConfigPartSCG includes the radioResourceConfigDedicatedSCG:
        3> reconfigure the dedicated radio resource configuration for the SCG as specified in 5.3.10.11;
    2> if the current UE configuration includes one or more split or SCG DRBs and the received RRCConnectionReconfiguration message includes radioResourceConfigDedicated including drb-ToAddModList:
        3> reconfigure the SCG or split DRB by drb-ToAddModList as specified in 5.3.10.12;
    2> if the received scg-ConfigPartSCG includes the sCellToReleaseListSCG:
        3> perform SCell release for the SCG as specified in 5.3.10.3a;
    2> if the received scg-ConfigPartSCG includes the pSCellToAddMod:
        3> perform PSCell addition or modification as specified in 5.3.10.3c;
NOTE 0: This procedure is also used to release the PSCell e.g. PSCell change, SI change for the PSCell.
    2> if the received scg-ConfigPartSCG includes the sCellToAddModListSCG:
        3> perform SCell addition or modification as specified in 5.3.10.3b;
    2> configure lower layers in accordance with mobilityControlInfoSCG, if received;
    2> if the received scg-ConfigPartSCG includes the mobilityControlInfoSCG (i.e. SCG change):
        3> resume all SCG DRBs and resume SCG transmission for split DRBs, if suspended;
        3> stop timer T313, if running;
        3> start timer T307 with the timer value set to t307, as included in the mobilityControlInfoSCG;
        3> start synchronising to the DL of the target PSCell;
        3> initiate the random access procedure on the PSCell, as specified in TS 36.321 [6]:
NOTE 1: The UE is not required to determine the SFN of the target PSCell by acquiring system information from that cell before performing RACH access in the target PSCell.
        3> the procedure ends, except that the following actions are performed when MAC successfully completes the random access procedure on the PSCell:
            4> stop timer T307;
            4> apply the parts of the CQI reporting configuration, the scheduling request configuration and the sounding RS configuration that do not require the UE to know the SFN of the target PSCell, if any;
            4> apply the parts of the measurement and the radio resource configuration that require the UE to know the SFN of the target PSCell (e.g. periodic CQI reporting, scheduling request configuration, sounding RS configuration), if any, upon acquiring the SFN of the target PSCell;
NOTE 2: Whenever the UE shall setup or reconfigure a configuration in accordance with a field that is received it applies the new configuration, except for the cases addressed by the above statements.

5.3.10.11 SCG Dedicated Resource Configuration
The UE shall:
1> if the received radioResourceConfigDedicatedSCG includes the drb-ToAddModListSCG:
    2> for each drb-Identity value included in the drb-ToAddModListSCG perform the DC specific DRB addition or reconfiguration as specified in 5.3.10.3a1
1> if the received radioResourceConfigDedicatedSCG includes the mac-MainConfigSCG:
    2> perform the SCG MAC main reconfiguration as specified in 5.3.10.4;
1> if the received radioResourceConfigDedicatedSCG includes the rlf-TimersAndConstantsSCG:
    2> reconfigure the values of timers and constants as specified in 5.3.10.7;

5.3.10.12 Reconfiguration SCG or Split DRB by drb-ToAddModList
The UE shall:
1> for each split or SCG DRBs that is part of the current configuration:
    2> if the corresponding drb-Identity value is included in the received drb-ToAddModList; and:
    2> if the corresponding drb-Identity value is not included in the received drb-ToAddModListSCG (i.e. reconfigure split, split to MCG or SCG to MCG):
        3> perform the DC specific DRB addition or reconfiguration as specified in 5.3.10.3a1;

5.3.10.13 Neighbour Cell Information Reconfiguration
The UE shall:
1> if the received naics-Info is set to release:
  2> instruct lower layer to release all the NAICS neighbour cell information for the concerned cell, if previously configured;
1> if the received naics-Info includes the neighCellsToReleaseList-r12:
  2> for each physCellId-r12 value included in the neighCellsToReleaseList-r12 that is part of the current NAICS neighbour cell information of the concerned cell:
    3> instruct lower layer to release the NAICS neighbour cell information for the concerned cell;
1> if the received naics-Info includes the NeighCellsToAddModList-r12:
  2> for each physCellId-r12 value included in the neighCellsToAddModList-r12 that is not part of the current NAICS neighbour cell information of the concerned cell:
    3> instruct lower layer to add the NAICS neighbour cell information for the concerned cell;
  2> for each physCellId-r12 value included in the neighCellsToAddModList-r12 that is part of the current NAICS neighbour cell information of the concerned cell:
    3> instruct lower layer to modify the NAICS neighbour cell information in accordance with the received NeighCellsInfo for the concerned cell;"

For the purposes of this disclosure, the following terms may be used, and exemplary and non-limiting descriptions are provided:

gNB, gNodeB: a base station in 5G New Radio (NR)

NR-DTCH: New Radio Dedicated Traffic Channel. A channel used to convey packet(s) of unicast service(s) in NR. It may be the same as or similar to a Dedicated Traffic Channel (DTCH) in LTE.

Low-end UE: a user equipment (UE) that does not support simultaneous communications with a network via more than one or more numerologies.

MBMS Service Area (MBMS SA): The area within which data of a specific MBMS session are sent. Each individual MBMS session of an MBMS Bearer Service may be sent to a different MBMS Service Area [e.g., 3GPP TS 23.246 v.14.1.0].
  A cell could belong to one or more MBMS SAs, and therefore is addressable by one or more MBMS SAIs [e.g., 3GPP TS 23.003 v.14.2.0].

NR-MCCH: New Radio Multicast Control Channel. A channel used to convey control information related to broadcast or multicast service(s) in NR. It may be the same as or similar to Multicast Control Channel (MCCH) or Single Cell Multicast Control Channel (SC-MCCH) in LTE [e.g., 3GPP TS 36.331 v.14.0.0].

NR-MCH: New Radio Multicast Channel. A channel used to convey packet(s) from NR-MCCH and NR-MTCH.

NR-MTCH: New Radio Multicast Traffic Channel. A channel used to convey packet(s) of broadcast or multicast service(s) in NR. It may be the same as or similar to Multicast Traffic Channel (MTCH) or Single Cell Multicast Traffic Channel (SC-MTCH) in LTE [e.g., 3GPP TS 36.331 v14.0.0].

Broadcast or multicast service: packet(s) of a broadcast or multicast service is provided to multiple UEs at once via broadcast or multicast manner. It may be MBMS service, Vehicle-to-Everything (V2X service), or for download, streaming, group communication, or TV.

Numerology: it could refer to a set of parameters which are used to define a frame structure and/or subframe structure. The set of parameters may include at least sub-carrier spacing, symbol length, cyclic prefix (CP) length, and/or TTI length.

Interest indication for broadcast or multicast: an indication used to notify the gNB that the UE is interested in reception of broadcast or multicast service(s). The indication may provide information related to the broadcast or multicast service(s) that the UE is interested in, e.g. frequency, service ID, and/or etc.

System information (SI) for broadcast or multicast: system information conveying configuration and/or information related to broadcast or multicast, e.g. configuration of NR-MCCH, configuration of NR-MCCH change notification, information of MBSFN area, information of broadcast or multicast service area, and/or etc. The SI may carry some or all of parameters carried by system information for MBMS in LTE, e.g. SystemInformationBlockType13, SystemInformationBlockType15, and/or SystemInformationBlockType20 [e.g., 3GPP TS 36.331 v.14.0.0].

TMGI: Temporary Mobile Group Identity. A TMGI can be used to identify one broadcast or multicast bearer service inside one pubic land mobile network (PLMN) in LTE [e.g., 3GPP TS 23.246 v14.1.0].

TTI: Transmission Time Interval, a scheduling unit in the time domain. TTI length is related to length of slot and/or symbol associated with the TTI, and/or related to numerology associated with the TTI.

USD: User Service Description, in which the application/service layer provides for each broadcast or multicast service the identity (e.g. TMGI in LTE), the session start and end time, the frequencies and/or etc. In LTE, USD further provides the MBMS service area identities belonging to the MBMS service area [e.g., 3GPP TS36.300 v14.0.0].

To inform the network about the interest for reception of broadcast or multicast service, a UE in RRC_CONNECTED needs to send an interest indication for broadcast or multicast to the gNB. Based on the interest indication for broadcast or multicast, the gNB would try to guarantee UE reception of the broadcast or multicast service, e.g., by determining proper serving cell(s) for the UE. In LTE, as disclosed in 3GPP TS 36.331 v.14.0.0, a UE can send an MBMSInterestIndication message to an eNB only if the UE has a valid version of system information related to broadcast or multicast service, i.e., SystemInformationBlockType15 (and SystemInformationBlockType20).

Figure 2:
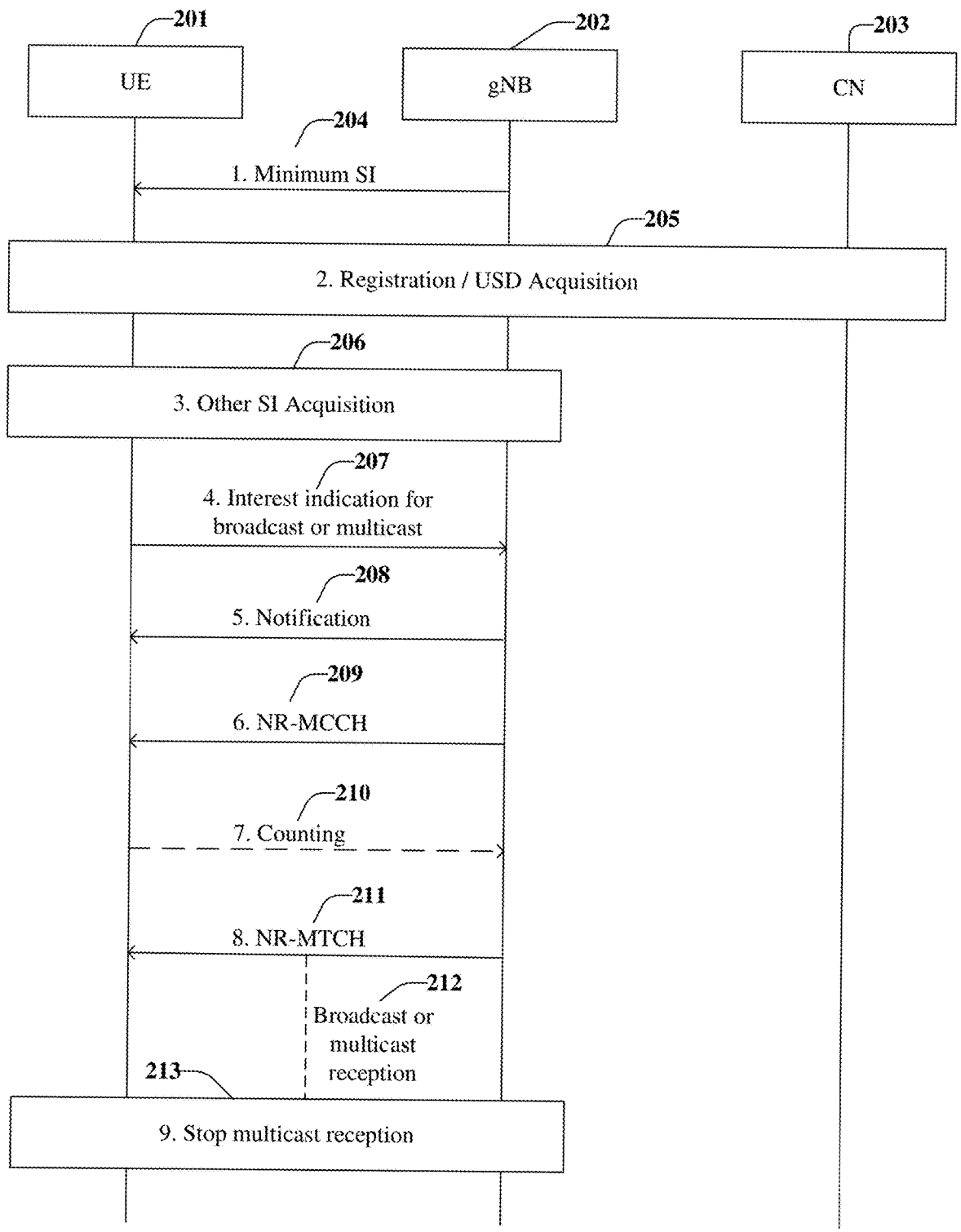
FIG. 2 illustrates an example, non-limiting flow diagram for acquiring a broadcast or multicast service of interest, in accordance with one or more embodiments described herein.

Turning to FIG. 2, illustrated is a possible procedure in NR, similar to that used for LTE, for broadcasting system information, including system information relating to broadcast or multicast service. The procedure illustrated herein includes three devices: UE 201, gNodeB 202, and core network 203. As illustrated in FIG. 2, gNB 202 is the serving cell for UE 201, and supports a broadcast or multicast service of interest. The delivery of broadcast or multicast services occurs in the following sequence:

At power on, the UE 201 performs cell selection and attaches to a suitable cell. The UE 201 receives from the gNB 202 minimum system information (Minimum SI) 204, which could be periodically broadcast. Minimum SI 204 includes basic information required for initial access to a cell, and information for acquiring any other SI. The other SI (Other SI) includes any other information not included in Minimum SI 204, and may be broadcast, or provisioned in a dedicated manner as triggered by the network or upon request from the UE 201. In LTE, system information relating to MBMS is provided in System Information Blocks (SIB), e.g., SystemInformationBlockType2, SystemInformationBlockType13, SystemInformationBlockType15, SystemInformationBlock20. Based on the Minimum SI 204, the UE 201 can determine if Other SI relating to broadcast or multicast service availability for that cell.

At Step 205, the UE 201 performs an initial attach to the network, enters the RRC_CONNECTED state, and completes registration and authorization/authentication process. The UE 201 may establish a packet data network (PDN) connection with a broadcast or multicast entity in the core network (CN) 203, and acquire User Service Description (USD) information from the broadcast or multicast entity.

In order to access or receive broadcast or multicast services, the UE 201 may require configuration information for reception of the broadcast or multicast service. The configuration information can be provided to the UE 201 in a system information, which could be provided in an Other SI. At Step 206, the UE 201 acquires the Other SI. To initiate Other SI acquisition, the UE 201 may trigger transmission of the Other SI from the gNB 202 by sending a request, e.g., a RRC message or a MAC control element. After the UE 201 sends the request, the gNB 202 may provide the Other SI requested by the UE 201 to the UE 201.

The UE 201 transmits an interest indication 207 for broadcast or multicast to the gNB 202 to guarantee reception of the broadcast or multicast service of interest. An example of an interest indication for broadcast or multicast in LTE is MBMSInterestIndication. The UE 201 then monitors the New Radio Multicast Control Channel (NR-MCCH). If the UE 201 receives the notification 208 from the gNB 202, the UE 201 receives new control information on NR-MCCH 209. The new control information could indicate start of the broadcast or multicast service(s).

The UE 201 may be aware of a need for (e.g., may utilize) a broadcast or multicast counting based on the new control information received on NR-MCCH 209. Based on the received control information, the UE 201 can decide (e.g., determine) when and how to start to receive the broadcast or multicast service of interest over a New Radio Multicast Traffic Channel (NR-MTCH). If a broadcast or multicast counting is required for the broadcast or multicast service of interest, then the UE 201 transmits a counting response 210 to the gNB 202. Based on the control information received on NR-MCCH 209 (and New Radio Multicast Channel (NR-MCH) scheduling information), the UE 201 receives the broadcast or multicast service of interest over NR-MTCH 211. When the session(s) for all the broadcast or multicast service of interest 212 concludes (or if the UE terminates interest of the session(s)), at Step 213, the UE 201 stops monitoring broadcast or multicast service.

In NR, Other SI for broadcast or multicast could be on-demand system information. The UE 201 may obtain the Other SI by sending a request related to the Other SI for broadcast or multicast to the gNB 202. The gNB 202 may deliver the Other SI for broadcast or multicast based on the request. Upon receipt of the Other SI for broadcast or multicast from the gNB 202, the UE 201 may further transmit an interest indication for broadcast or multicast 207 to the gNB 202.

Figure 3:
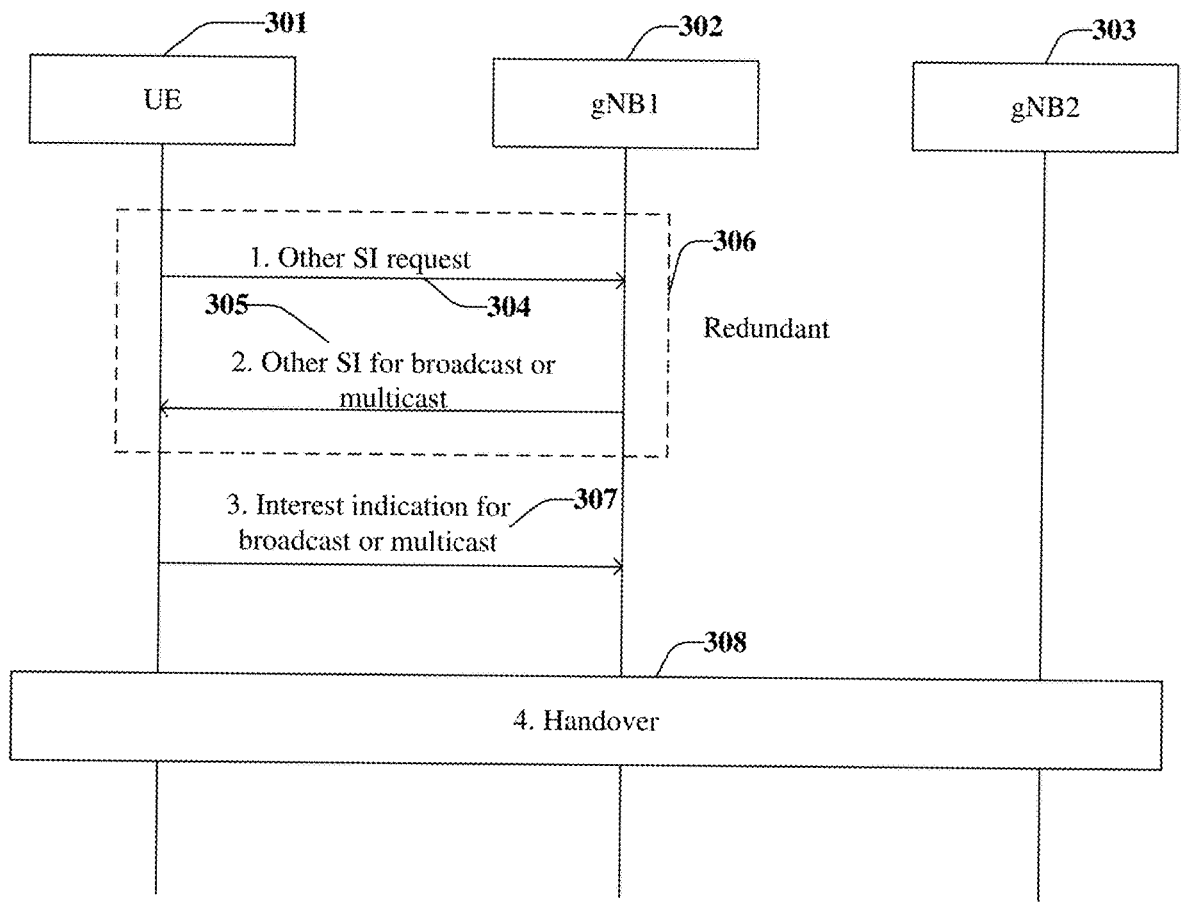
FIG. 3 illustrates an example, non-limiting flow diagram for handover of a UE from one gNodeB to another gNodeB, in accordance with one or more embodiments described herein.

However, if the serving cell does not provide the broadcast or multicast service(s) that the UE (e.g. in RRC_CONNECTED) is interested in, serving cell(s) of the UE may be changed by the gNB, e.g., via handover procedure, in order to let (e.g., enable) the UE receive the broadcast or multicast service(s). FIG. 3 illustrates an example, non-limiting scenario of handover of a UE 301 from one serving cell (i.e., the cell to which the UE 301 is connected or attached) to another in order to access the broadcast or multicast service of interest. As illustrated, a UE 301 is connected to gNB1 302, which does not provide the broadcast or multicast service of interest. The UE 301 transmits an Other SI request 304 to gNB1 302, which transmits back Other SI 304 for broadcast or multicast services. After the UE 301 receives the Other SI 305 from gNB1 302, the UE 301 transmits to gNB1 302 an interest indication 307 for broadcast or multicast. The interest indication for broadcast or multicast 307 may include a list of frequencies for the broadcast or multicast service(s) of interest, which were included in the Other SI 305. At Step 308, gNB1 302 performs a handover operation to transfer the UE connection from a cell belonging to gNB1 302 to another cell (e.g. neighbor cell) belonging to gNB2 303, which does provide the broadcast or multicast service(s) of interest. Because the cell belonging to gNB1 302 does not support the broadest or multicast service(s) of interest, the scenario illustrated in FIG. 2 results in latency due to executing redundant procedures 306, e.g., on-demand delivery of unnecessary Other SI, and signaling overhead. Regardless, the UE already knows frequency band(s) of current serving cell(s) and acquiring the Other SI broadcast or multicast results in latency and signaling overhead.

Some possible enhancement(s) can be considered in NR (and/or may be considered in LTE) for the identified issue. To avoid the latency and signaling overhead issues illustrated in FIG. 3, the UE can directly transmit an interest indication for broadcast or multicast to the gNB to which the UE is connected without first acquiring complete and/or valid Other SI for broadcast or multicast (e.g. System Information for broadcast or multicast). Accordingly, the UE may not need to transmit a system information request to acquire the Other SI for broadcast or multicast prior to transmitting the interest indication for broadcast or multicast. For example, the UE first checks whether its serving cell provides broadcast or multicast service via a broadcast or multicast manner. Alternatively, the UE can determine whether its serving cell provides broadcast or multicast service based on contents of a periodic message from the serving cell, e.g., Minimum SI, partial Minimum SI, Master Information Block (MIB), or System Information Block Type 1 (SIB1). If the serving cell supports the broadcast or multicast service, then the UE will transmit an interest indication for broadcast or multicast in the serving cell(s). It should be noted that the UE transmits the interest indication for broadcast or multicast without having valid Other SI for broadcast or multicast from the serving cell. In transmitting the interest indication for broadcast or multicast, the UE could be in the RRC CONNECTED state.

The UE may not transmit the interest indication for broadcast or multicast when the UE is in the RRC IDLE or RRC INACTIVE states. In such states, the UE could transmit a system information request to the gNB for a broadcast or multicast service if the UE does not have valid Other SI for broadcast or multicast for the serving cell. The system information request can be a RRC message different from an interest indication for broadcast or multicast. Alternatively, the system information request may comprise a specific random access preamble. The system information request can be transmitted through a random access procedure.

The interest indication for broadcast or multicast can indicate one or more of various types of information. For example, the interest indication for broadcast or multicast may include the identity(ies) of the broadcast or multicast service(s) of interest (e.g., service ID, session ID, and/or TMGI), frequencies related to the broadcast or multicast service(s) of interest, and/or broadcast or multicast areas identity(ies) related to the broadcast or multicast service(s) of interest (e.g., MBSFN-AreaID, MBMS SAI, PLMN ID, CBI, ECGI, p-serviceArea, cell identity). The interest indication for broadcast or multicast also could include priority between unicast service and broadcast or multicast service, an (explicit or implicit) information of whether the UE has valid system information for broadcast or multicast (e.g., of which serving cell(s), or whether the UE requires such system information). Further, the interest indication could include information relating to one or more measurement result(s) of neighbor cell(s), UE capability related information (e.g., numerology, numerologies combination, band combinations, beam forming), and/or numerology(ies) relating to the broadcast or multicast service(s) of interest. The measurement result(s) of the neighbor cell(s) may be utilized by the gNB in determining handover. Preferably, the information relating to UE capability includes numerology related to the broadcast or multicast service(s) of interest. In one aspect of this disclosure, the UE capability related information includes numerology that the UE can support. In another embodiment, the UE capability related information includes band combinations which the UE can support. The band combinations could be combination related to frequency of service the UE is interested in and/or MBMS (dedicated) carrier. Preferably, the UE could set content of the interest indication for broadcast or multicast, e.g. to be transmitted in a serving cell, without considering content of Other SI for broadcast or multicast, e.g. of the serving cell. In alternative implementations, the UE could set the content of the interest indication for broadcast or multicast, e.g., to be transmitted in a serving cell, based on the content of Other SI for broadcast or multicast, e.g., of the serving cell, if the UE has valid Other SI for broadcast or multicast, e.g. of the serving cell.

Based on the UE capability related information, the gNB could have more information for taking corresponding handling. For example, the gNB may determine whether to provide Other SI for broadcast or multicast to the UE. In such instances, the Other SI for broadcast or multicast could be based on the numerology reported by the UE. In addition, the gNB may determine whether to add a new cell or to handover the UE to another cell based on information reported by the UE. as the information reported by the UE could be band combination or the information relating to UE capability. Finally, if a neighboring cell provides the broadcast or multicast service of interest, the gNB could decide (e.g., determine) whether to provide Other SI for broadcast or multicast of the neighboring cell to the UE.

It may be desirable to limit the size of the interest indication for broadcast or multicast that is transmitted from the UE, including only part of the information. As an exemplary aspect, the size of the interest indication for broadcast or multicast can be limited based on a measurement result of cell and/or frequency. In one embodiment, the size of the interest indication for broadcast or multicast can be limited based on indicating a frequency for the broadcast or multicast service(s) of interest if the measurement result for the frequency is above a threshold. Conversely, the frequency may not be indicated if the corresponding measurement result is lower than a threshold. Additionally or alternatively, the size of the interest indication for broadcast or multicast can be limited based on the priority of broadcast or multicast service. Additionally or alternatively, the size of the interest indication for broadcast or multicast can be limited based on information on neighbor cells and/or neighboring frequencies provided by the gNB. Such information may be provided in system information similar to SystemInformationBlock3, SystemInformationBlock4, and SystemInformationBlock5 in LTE. In LTE, that system information indicates a frequency if it comprises a neighboring frequency of the serving cell or a neighbor cell operating on the frequency. The system information may not indicate a frequency if it is not a neighboring frequency of the serving cell. The interest indication for broadcast or multicast indicates a frequency if the frequency is neighboring frequency of the serving cell or there is a neighbor cell operating on the frequency. The interest indication for broadcast or multicast doesn't indicate another frequency if the frequency is not neighboring frequency of the serving cell.

Figure 4:
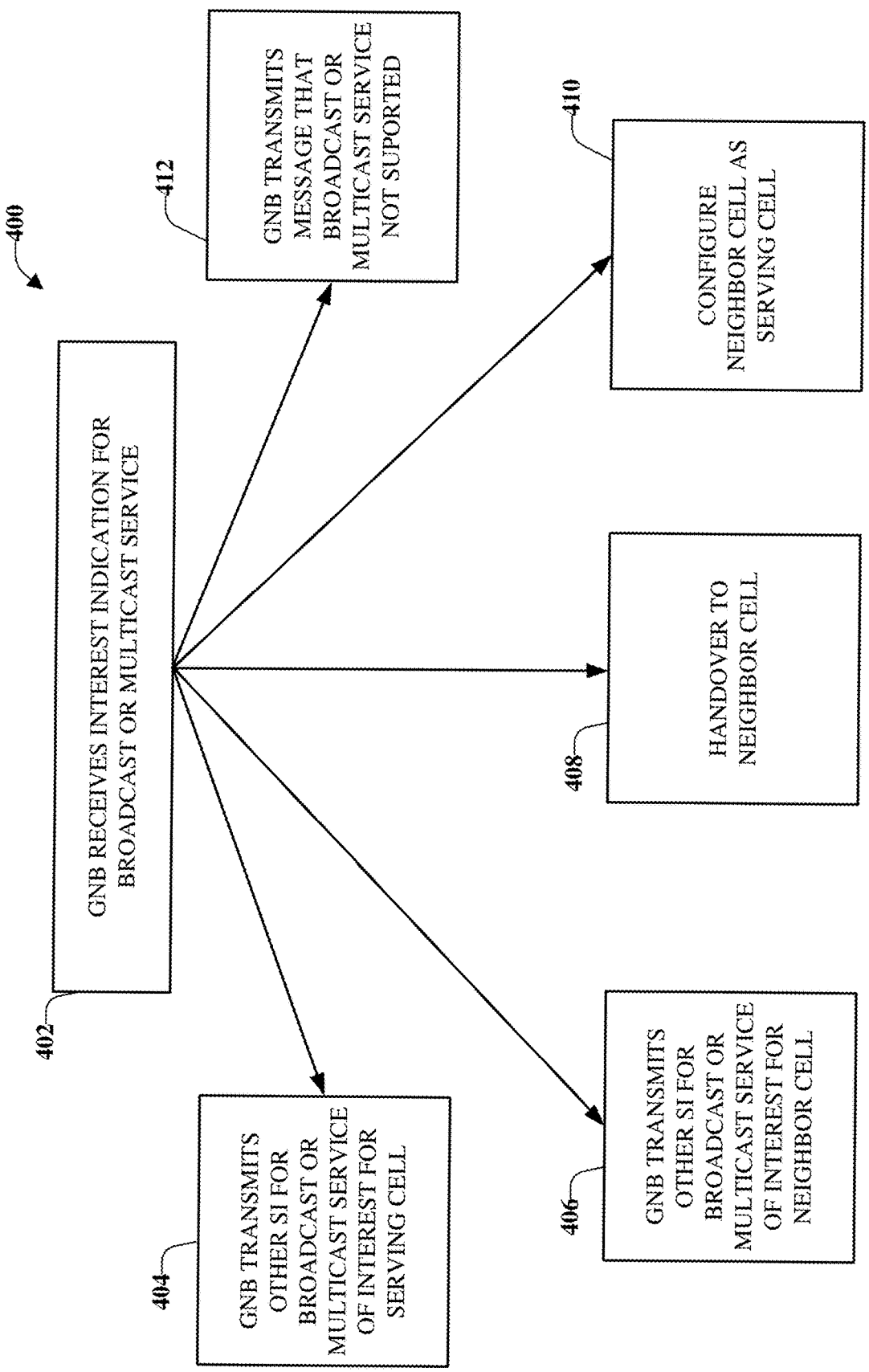
FIG. 4 illustrates example, non-limiting, alternate methodologies for responding to an interest indication for broadcast or multicast, in accordance with one or more embodiments described herein.

After the UE transmits an interest indication for broadcast or multicast to the gNB, the gNB could decide (e.g., determine) the corresponding actions for responding to the interest indication for broadcast or multicast. FIG. 4 illustrates an example, non-limiting methodology for a gNB to respond to the interest indication for broadcast or multicast. As illustrated in flow diagram 400, at Step 402, the gNB receives the interest indication for broadcast or multicast from a UE. At Step 404, the gNB could transmit Other SI for broadcast or multicast (of the serving cell(s)) via unicast or broadcast to the UE. In one aspect of this disclosure, the gNB transmits Other SI for broadcast or multicast of the serving cell(s) if the gNB has information that the UE does not have valid Other SI for the broadcast or multicast of the serving cell(s). The gNB will proceed to Step 404 if the broadcast or multicast service that is or is to be provided in the serving cell is the broadcast or multicast service(s) of interest, if the serving cell operates on the same frequency as indicated in the interest indication for the broadcast or multicast, and/or if the serving cell of the UE belongs to a broadcast or multicast area (e.g., in LTE and UMTS, MBSFN-AreaID, MBMS SAI, PLMN, CGI, ECGI, and/or p-serviceArea) indicated in the interest indication for the broadcast or multicast. In one embodiment, the gNB could decide whether the broadcast or multicast service that is provided or is to be provided in the serving cell is the broadcast or multicast service(s) of interest based on the interest indication for the broadcast or multicast. In addition, the gNB will proceed to Step 404 if the identity(ies) of the serving cell(s) of the UE is indicated in the interest indication for the broadcast or multicast, if the serving cell supports numerology reported in the interest indication, or if the gNB determines that the UE is able to receive the broadcast or multicast service(s) of interest in the serving cell. Finally, the gNB will transmit the Other SI, as per Step 404, if the interest indication for broadcast or multicast indicates that the UE does not have a valid Other SI for broadcast or multicast of the serving cell, or indicates that the UE needs to acquire the Other SI for broadcast or multicast of the serving cell. The interest indication for broadcast or multicast could indicate such information by including an explicit indication and/or by condition to transmit, e.g., UE state change. The interest indication for broadcast or multicast could also indicate such information by including a special value in a field with different purposes, e.g., re-sending reported broadcast or multicast service identity, repeatedly reporting the same value of some fields, reporting zero in a field normally filled with non-zero values.

Alternatively, at Step 406, the gNB could transmit to the UE Other SI for broadcast or multicast of the UE's neighbor cell(s) (rather than the serving cell) in a unicast or broadcast manner. In one embodiment, the gNB could transmit to the UE Other SI for broadcast or multicast of the UE's neighbor cell(s), if the gNB knows (e.g., learns) that the UE does not have valid Other SI of broadcast or multicast of the neighbor cell(s). The gNB will proceed to Step 406 if the broadcast or multicast service that is or is to be provided in the neighbor cell is the broadcast or multicast service(s) of interest, if the neighbor cell operates on the same frequency as indicated in the interest indication for broadcast or multicast, and/or the neighbor cell of the UE belongs to a broadcast or multicast area (e.g., in LTE and UMTS, MBSFN-AreaID, MBMS SAI, PLMN, CGI, ECGI, and/or p-serviceArea) indicated in the interest indication for broadcast or multicast. In one embodiment, gNB could decide (e.g., determine) whether the broadcast or multicast service that is or is to be provided in the neighbor cell is the broadcast or multicast service(s) of interest based on the interest indication for the broadcast or multicast. In addition, the gNB will proceed to Step 406 if the identity(ies) of the neighbor cell(s) of the UE is indicated in the interest indication for broadcast or multicast, if the neighbor cell supports the numerology reported in the interest indication for broadcast or multicast, and/or if the gNB determines that the UE is able to receive the broadcast or multicast service of interest in the neighbor cell. Finally, the gNB will transmit the other SI for broadcast or multicast of the neighbor cell(s), as per Step 406, if the interest indication for broadcast or multicast indicates that the UE does not have a valid Other SI for broadcast or multicast of the neighbor cell(s), or indicates that the UE needs to acquire the Other SI for broadcast or multicast of the neighbor cell(s). The interest indication for broadcast or multicast could indicate such information by including an explicit indication and/or by condition to transmit, e.g., UE state change. The interest indication for broadcast or multicast could also indicate such information by including a special value in a field with different purposes, e.g., re-sending reported broadcast or multicast service identity, repeatedly reporting the same value of some fields, reporting zero in a field normally filled with non-zero values.

The Other SI for the broadcast or multicast service that is transmitted at Step 404 and Step 406 includes broadcast or multicast control channel configuration (used in the serving cell(s) and/or neighbor cell(s)), e.g., configuration of New Radio Multicast Control Channel (NR-MCCH), and/or broadcast or multicast data channel configuration (used in the serving cell(s) and/or neighbor cell(s)), e.g., configuration of New Radio Multicast Channel (NR-MCH), New Radio Multicast Traffic Channel (NR-MTCH). Additionally, the Other SI for the broadcast or multicast service transmitted at Step 404 and Step 406 includes a list of broadcast or multicast services provided in the serving cell(s) and/or neighbor cell(s) (e.g., list of service ID, session ID, TMGI), or broadcast or multicast area identities of the serving cell(s) and/or neighbor cell(s) (e.g., MBSFN-AreaID, MBMS SAI, PLMN, CGI, ECGI, and/or p-serviceArea). Additionally, the Other SI for the broadcast or multicast service transmitted at Step 404 and Step 406 includes frequencies related to broadcast or multicast services or numerology information for receiving broadcast or multicast service.

Another possible response by the gNB to the interest indication for broadcast or multicast is to proceed to Step 408, a handover of the UE to a neighbor cell, or to proceed to Step 410, configuring the neighbor cell as an additional serving cell. The gNB will proceed to Step 408 or Step 410 if the broadcast or multicast service that is or is to be provided in the neighbor cell is the broadcast or multicast service(s) of interest, if the neighbor cell of the UE operates on the same frequency indicated in the interest indication for broadcast or multicast, or the neighbor cell of the UE belongs to a broadcast or multicast area (e.g., in LTE and UMTS, MBSFN-AreaID, MBMS SAI, PLMN, CGI, ECGI, and/or p-serviceArea) indicated in the interest indication for broadcast or multicast. In addition, the gNB will proceed to Step 408 or Step 410 if the serving cell of the UE does not provide any broadcast or multicast service(s) of interest, as identified in the interest indication for broadcast or multicast, does not operate on a frequency identified in the interest indication for broadcast or multicast, and/or does not belong to a broadcast or multicast area, identified by e.g., MBSFN-AreaID, MBMS SAI, PLMN, CGI, ECGI, and/or p-serviceArea, in the interest indication for broadcast or multicast. The gNB also will proceed to Step 408 or Step 410 if the neighbor cell provides the broadcast or multicast service identified in the interest indication for broadcast or multicast, utilizes a frequency identified in the interest indication for broadcast or multicast, belongs to a broadcast or multicast area, identified by, e.g., MBSFN-AreaID, MBMS SAI, PLMN, CGI, ECGI, and/or p-serviceArea, identified in the interest indication, and/or supports numerology reported in the interest indication for broadcast or multicast. Further, the gNB will proceed to Step 408 or Step 410 if the measurement result of the neighbor cell(s) is good enough (e.g., adequate) for the UE, e.g, above a threshold, or if the serving cell and the neighbor cell are a band combination identified in the interest indication for broadcast or multicast. Finally, the gNB will proceed to Step 408 or Step 410 if the identity of the serving cell of the UE is not identified in the interest indication for broadcast or multicast and/or if the identity of the neighbor cell is indicated in the interest indication for broadcast or multicast. Preferably, the neighbor cell is added to the UE as a SCell or (P)SCell. Also, the UE 501 is able to simultaneously receive transmissions from the serving cell and the (P)SCell. In an exemplary aspect of the disclosure, the neighbor cell is on a dedicated carrier for broadcast or multicast service.

Another possible response by the gNB to the interest indication for broadcast or multicast is to proceed to Step 412. At Step 412, the gNB transmits a message to indicate that the UE's interested broadcast or multicast service(s) are not provided in the serving cell(s) and/or neighbor cell(s). In one exemplary aspect of the disclosure, the message could include one or multiple suggested cell identity(ies). Additionally, the message could include one or multiple suggested frequency(ies). Additionally, the message could include one or multiple service identity(ies) which not provided in this serving cell and/or neighbor cells. The gNB will proceed to Step 412 if the serving cell of the UE does not provide broadcast or multicast service(s) indicated in the interest indication for broadcast or multicast, does not support numerology reported in the interest indication for broadcast or multicast, does not operate on a frequency indicated in the interest indication for broadcast or multicast, and/or does not belong to a broadcast or multicast area (e.g., MBSFN-AreaId, MBMS SAI, PLMN, CGI, ECGI, and/or p-serviceArea) indicated in the interest indication for broadcast or multicast. The gNB will proceed to Step 412 if no neighbor cells provide broadcast or multicast service(s) indicated in the interest indication for broadcast or multicast, operate on same frequency indicated in the Interest indication for broadcast or multicast, belongs to a broadcast or multicast area (e.g. MBSFN-AreaId, MBMS SAI, PLMN, CGI, ECGI, and/or p-serviceArea) indicated in the interest indication for broadcast or multicast, and/or support numerology reported in the interest indication for broadcast or multicast. Further, the gNB will proceed to Step 412 if identity of the serving cell of the UE is not indicated in the interest indication for broadcast or multicast, the serving cell and neighbor cells with good enough measurement result are not a band combination indicated in the Interest indication for broadcast or multicast, none of identities of neighbor cell(s) are indicated in the Interest indication for broadcast or multicast, and/or measurement result of neighbor cells are not good enough for the UE (e.g. over a threshold).

Turning to FIG. 5, illustrated is an example non-limiting scenario applying an enhancement for responding to an interest indication for broadcast or multicast. In this scenario, the UE 501 transmits to gNB1 502 an interest indication for broadcast or multicast 504. The interest indication for broadcast or multicast 504 could indicate broadcast or multicast service(s) of interest. The gNB1 502 could provide Other SI for broadcast or multicast 505 for gNB2 503, which does support a broadcast or multicast service(s) of interest, or the gNB1 502 could send information 506 adding a new cell for receiving the broadcast or multicast service of interest to the UE 501, or gNB1 502 could perform a handover operation to transfer the connection with UE 501 to gNB2 503 for the broadcast or multicast service(s) of interest, because gNB1 502 does not support the broadcast or multicast of interest and the gNB2 503 does provide that support, or gNB1 502 could send a rejection and/or release 508, to UE 501, rejecting the interest indication for broadcast or multicast, and/or releasing the connection with the UE 501.

As an alternative to performing a handover operation, gNB1 502 may send UE 502 a message indicating that the broadcast or multicast service(s) of interest are not provided in the serving cell and/or neighbor cell. gNB1 502 may respond accordingly if the serving cell of UE 502 or any neighbor cell does not provide the broadcast or multicast service of interest, does not operate on a frequency identified in the interest indication, or does not support the numerology identified in the interest indication. Moreover, the gNB1 502 may send the message if the serving cell of UE 502 and or any neighbor cell does not belong to a broadcast or multicast area, as identified by, e.g., MBSFN-AreaID, MBMS SAI, PLMN, CGI, ECGI, and/or p-serviceArea, identified in the interest indication for broadcast or multicast. Further, gNB1 502 may send the message if the measurement results of the neighbor cells are not sufficient for UE 502 (e.g., not above a threshold), or if the serving cell and neighbor cells with acceptable measurement results are not a band combination identified in the interest indication. Finally, gNB1 502 will send the message if no neighbor cell provides the broadcast or multicast service of interest, as identified in the interest indication, or if no neighbor cell is identified in the interest indication. The message transmitted by gNB1 502 may include one or more multiple suggested cell identities, suggested frequencies, or service identities which are not provided in the serving cell and/or neighbor cells.

Figure 6:
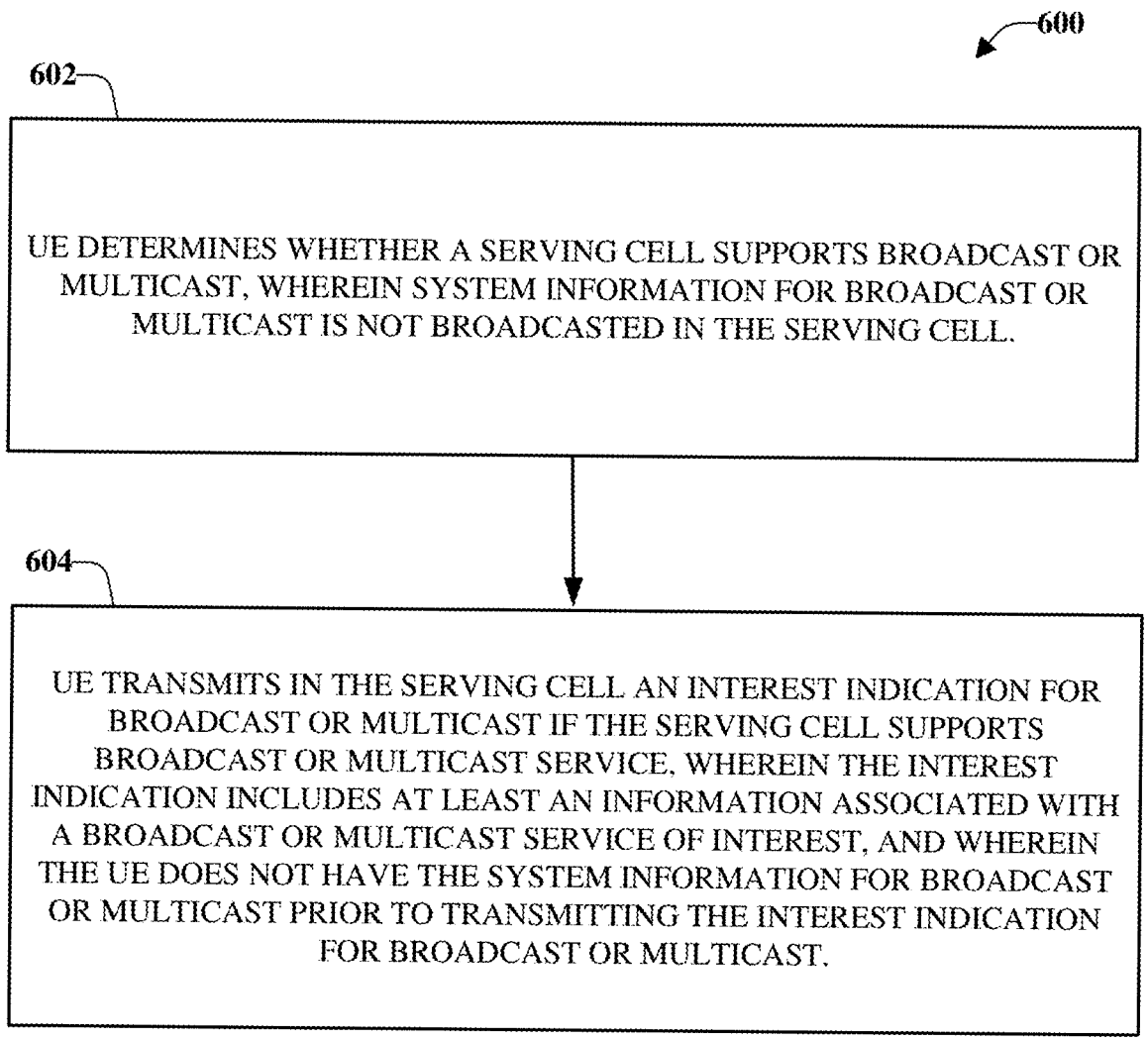
FIG. 6 illustrates an example, non-limiting methodology for transmitting an interest indication for broadcast or multicast without having system information for broadcast or multicast, in accordance with one or more embodiments described herein.

FIG. 6 illustrates an example, non-limiting methodology for transmitting an interest indication for broadcast or multicast. As illustrated in the flow diagram 600, at Step 602, the UE determines whether a serving cell supports broadcast or multicast service, wherein system information for broadcast or multicast is not broadcasted in the serving cell. At Step 604, the UE transmits in the serving cell an interest indication for broadcast or multicast if the serving cell supports broadcast or multicast service, wherein the interest indication includes at least an information associated with a broadcast or multicast service of interest, and wherein the UE does not have the system information for broadcast or multicast prior to transmitting the interest indication for broadcast or multicast. In one embodiment, the UE performs the transmission of the interest indication for broadcast or multicast if the serving cell supports broadcast or multicast service. In another or alternative embodiment, the information includes an identity of the broadcast or multicast service of interest.

Figure 7:
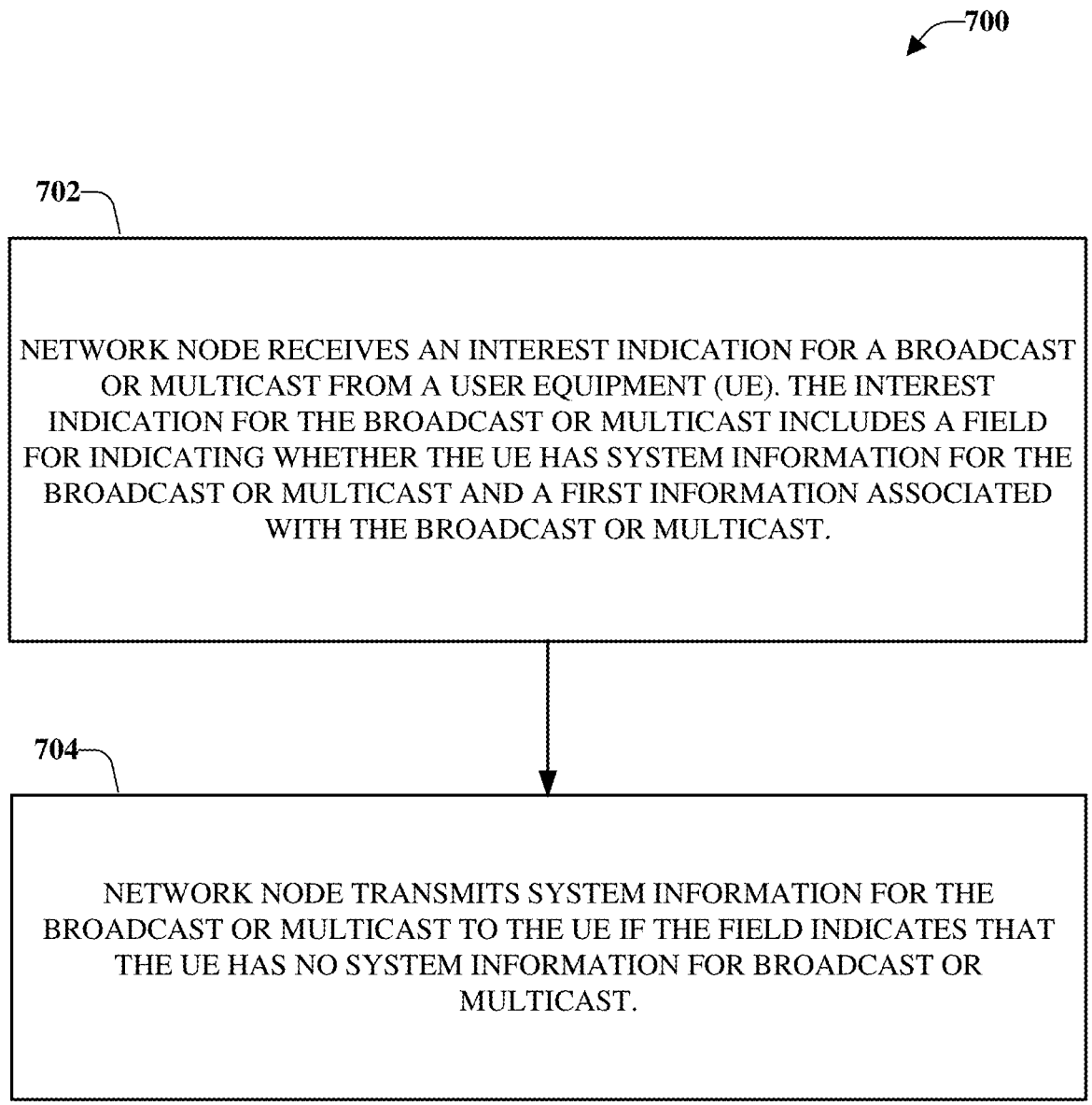
FIG. 7 illustrates an example, non-limiting methodology for transmitting system information for broadcast or multicast, wherein the UE has no system information for broadcast or multicast, in accordance with one or more embodiments described herein.

FIG. 7 illustrates an example, non-limiting methodology for transmitting system information for broadcast or multicast. As illustrated in the flow diagram 700, at Step 702, the network node receives an interest indication for broadcast or multicast from a UE. The interest indication includes a field for indicating whether the UE has system information for broadcast or multicast and an information associated with the broadcast or multicast service of interest. At Step 704, the network node transmits system information for broadcast or multicast to the UE if the field indicates that the UE has no system information for broadcast or multicast.

One embodiment of this disclosure is a method for a UE, comprising determining whether a serving cell supports broadcast or multicast service, and transmitting an interest indication for broadcast or multicast if the serving cell supports broadcast or multicast service, wherein the interest indication includes at least a first information associated with a first broadcast or multicast service. In another embodiment, the method further comprises receiving a first message for handover of the UE to a first cell after transmitting the interest indication for broadcast or multicast, if the UE is in RRC CONNECTED, and the serving cell does not provide the first broadcast or multicast service. In a further embodiment, the first cell provides the first broadcast or multicast service.

One embodiment further comprises receiving a first message for handover of the UE to a first cell after transmitting the interest indication for broadcast or multicast, if the UE is in RRC CONNECTED and the serving cell does not belong to a broadcast or multicast area associated with the first broadcast or multicast service. In a further embodiment, the first cell belongs to a broadcast or multicast area associated with the first broadcast or multicast service. Another embodiment further comprises receiving a first message for handover of the UE to a first cell after transmitting the interest indication for broadcast or multicast, if the UE is in RRC CONNECTED and the measurement result of the first cell is over a threshold.

In one embodiment, the method further comprises receiving a first message for handover of the UE to a first cell after transmitting the interest indication for broadcast or multicast, if the UE is in RRC CONNECTED and the first cell supports numerology reported in the interest indication for broadcast or multicast. Another embodiment further comprises receiving a first message for handover of the UE to a first cell after transmitting the interest indication for broadcast or multicast, if the UE is in RRC CONNECTED and the serving cell is not on a frequency associated with the first broadcast or multicast service. In a further embodiment, the first cell is on the frequency associated with the first broadcast or multicast service.

In an embodiment of this disclosure, the method for the UE further comprises receiving the system information for broadcast or multicast after transmitting the interest indication for broadcast or multicast, if the serving cell provides the first broadcast or multicast service. Another embodiment further comprises receiving system information for broadcast or multicast after transmitting the interest indication for broadcast or multicast, if the serving cell belongs to a broadcast or multicast area associated with the first broadcast or multicast service. A further embodiment comprises receiving system information for broadcast or multicast after transmitting the interest indication for broadcast or multicast, if the serving cell is on a frequency associated with the first broadcast or multicast service.

One embodiment of this disclosure further comprises the UE receiving system information for broadcast or multicast after transmitting the interest indication for broadcast or multicast, if the interest indication for broadcast or multicast indicates the UE does not have the system information for broadcast or multicast. Another embodiment further comprises receiving system information for broadcast or multicast after transmitting the interest indication for broadcast or multicast, if the interest indication indicates the UE does not have the system information for broadcast or multicast. A further embodiment includes receiving system information for broadcast or multicast after transmitting the interest indication for broadcast or multicast, if the serving cell supports numerology reported in the interest indication for broadcast or multicast.

One embodiment of this disclosure further comprises the UE receiving a message after transmitting the interest indication for broadcast or multicast, wherein the message indicates the serving cell does not provide the broadcast or multicast service of interest.

One embodiment of this disclosure further comprises receiving a second message to configure the UE with a second cell after transmitting the interest indication for broadcast or multicast. In further embodiments, the second cell provides the first broadcast or multicast service, belongs to a broadcast or multicast area associated with the first broadcast or multicast service, is on the frequency associated with the first broadcast or multicast service, and/or supports numerology reported in the interest indication for broadcast or multicast. In another embodiment, a measurement result of the second cell reported by the UE is over a threshold. In another embodiment, the second cell and the serving cell belong to a band combination indicated in the interest indication for broadcast or multicast. An additional embodiment further comprises receiving data of the first broadcast or multicast service from the second cell.

One embodiment further comprises receiving a third message after transmitting the interest indication for broadcast or multicast, wherein the third message indicates the serving cell does not provide the first broadcast or multicast service. In other embodiments, the third message includes one or multiple cell identities, one or multiple broadcast or multicast service service identities, and/or one or multiple frequencies.

One embodiment of this disclosure is a method for a network node, comprising receiving an interest indication for broadcast or multicast from a UE, wherein the interest indication includes a field for indicating whether the UE has system information for broadcast or multicast and a first information associated with a first broadcast or multicast service, and transmitting system information for broadcast or multicast to the UE if the field indicates that the UE has no system information for broadcast or multicast. In other embodiments, the first information is one or multiple broadcast or multicast area identities related to service(s) for which the UE is interested, is one or multiple service identities, includes an identity of the first broadcast or multicast service, is one or multiple frequencies, and/or is one or multiple numerologies. In further embodiments, the system information for broadcast or multicast includes one or multiple broadcast or multicast area identities, one or multiple service identities, one or multiple frequencies, and/or includes broadcast or multicast control channel configuration. In additional embodiments, the broadcast or multicast control channel is MCCH or NR-MCCH.

In one embodiment of this disclosure, the system information for broadcast or multicast includes broadcast or multicast data channel configuration. In one embodiment of this disclosure, the system information for broadcast or multicast includes broadcast or multicast control channel configuration. Additionally, the system information in another embodiment is not broadcasted in the serving cell. In a further embodiment, the first information is derived from a USD of the first broadcast or multicast service. Moreover, the interest indication may include a field for indicating whether the UE has the system information for broadcast or multicast. In one embodiment, the interest indication for broadcast or multicast indicates whether the UE has the system information for broadcast or multicast.

Other embodiments of this disclosure include a measurement result of the first cell and/or the second cell, or a measurement result of a neighbour cell. In another embodiment, the interest indication includes band capability of the UE. In a further embodiment, the interest indication includes numerology capability of the UE.

In one embodiment, the UE is in RRC CONNECTED when the UE transmits the interest indication for broadcast or multicast. In another embodiment, the UE determines whether the serving cell supports broadcast or multicast service based on content of a periodic message broadcasted by the serving cell. The periodic message may be MIB or SIB1. Another embodiment further comprises transmitting a request for the system information for broadcast or multicast, instead of the interest indication for broadcast or multicast, in the serving cell if the UE does not have the system information for broadcast or multicast and if the serving cell supports broadcast or multicast service, wherein the UE is not in RRC CONNECTED.

In another embodiment, a communication device comprises a control circuit, a processor installed in the controlled circuit, and a memory installed in the control circuit and operatively coupled to the processor, wherein the processor is configured to execute a program code stored in the memory to perform any of the methods disclosed herein.

Figure 8:
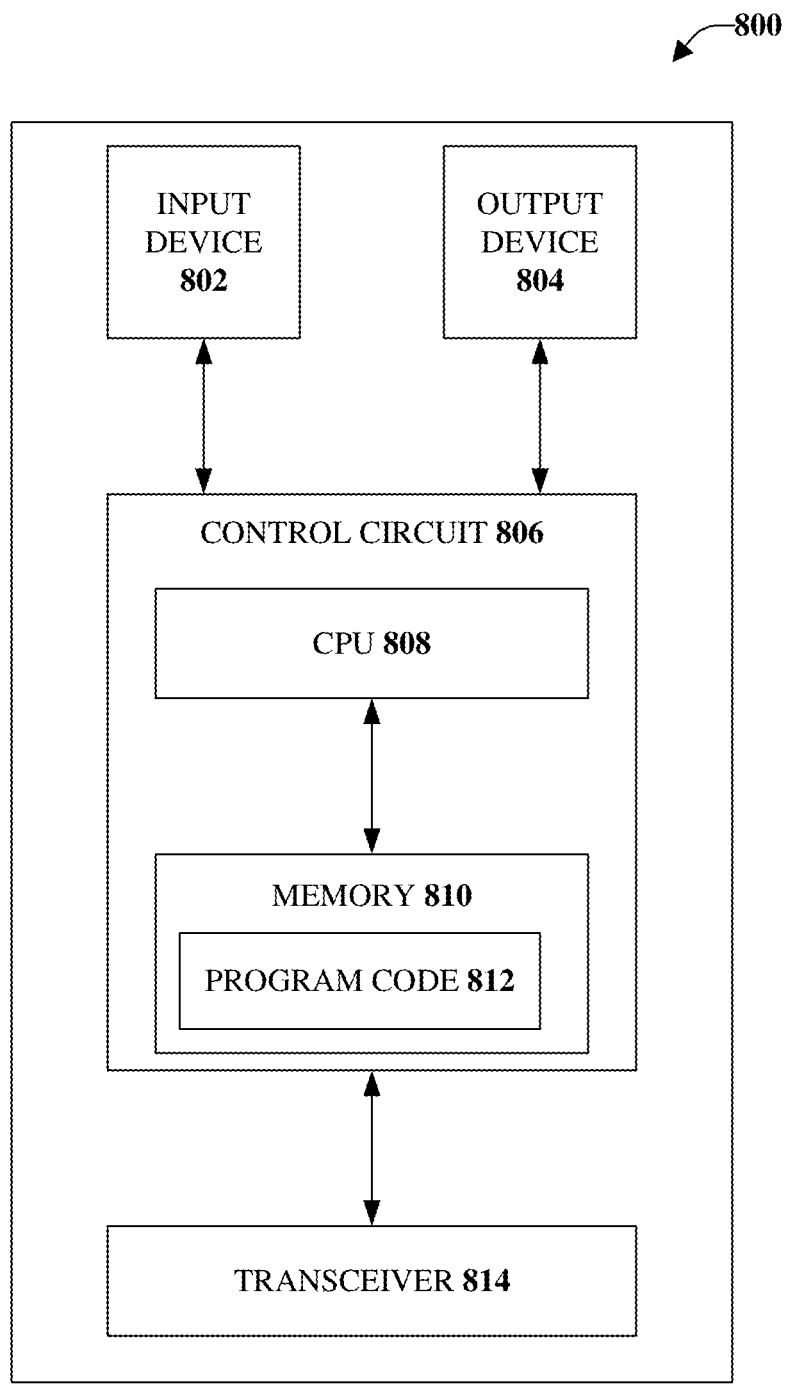
FIG. 8 illustrates an alternative simplified block diagram of a communication device, in accordance with one or more embodiments described herein.

Turning to FIG. 8, illustrated is an alternative simplified functional block diagram of a communication device 800 in accordance with one or more embodiments described herein. As illustrated in FIG. 8, the communication device 800 in a wireless communication system can be utilized for realizing the mobile devices (or UEs) 114 and 120 in FIG. 2, and the wireless communications system can be a 5G system. The communication device 800 can include an input device 802, an output device 804, a control circuit 806, a central processing unit (CPU) 808, a memory 810, a program code 812, and a transceiver 814. The control circuit 806 executes the program code 812 in the memory 810 through the CPU 808, thereby controlling an operation of the communications device 800. The program code can be executed to perform the techniques illustrated in FIGS. 2-7. The communications device 800 can receive signals input by a user through the input device 802, such as a keyboard or keypad, and can output images and sounds through the output device 804, such as a monitor or speakers. The transceiver 814 is used to receive and transmit wireless signals, delivering received signals to the control circuit 806, and outputting signals generated by the control circuit 806 wirelessly.

Figure 9:
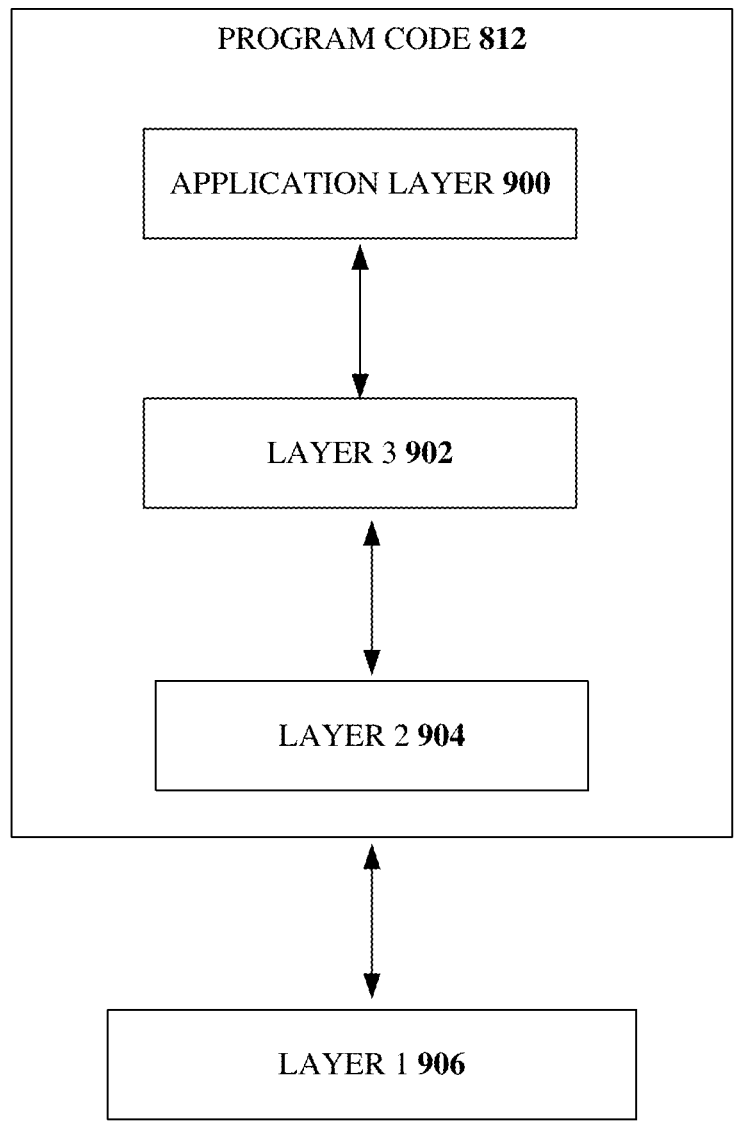
FIG. 9 illustrates a simplified block diagram of the program code shown in FIG. 8, in accordance with one or more embodiments described herein.

FIG. 9 is a simplified block diagram of the program code 812 shown in FIG. 8, in accordance with one or more embodiments described herein. In this embodiment, the program code 812 includes an application layer 900, a Layer 3 portion 902, and a Layer 2 portion 904, and is coupled to a Layer 1 portion 906. The Layer 3 portion 902 generally performs radio resource control. The Layer 2 portion 904 generally performs link control. The Layer 1 portion 906 generally performs physical connections. For a 5G system, the Layer 2 portion 904 may include a Radio Link Control (RLC) layer and a Medium Access Control (MAC) layer. The Layer 3 portion 902 may include a Radio Resource Control (RRC) layer.

Figure 10:
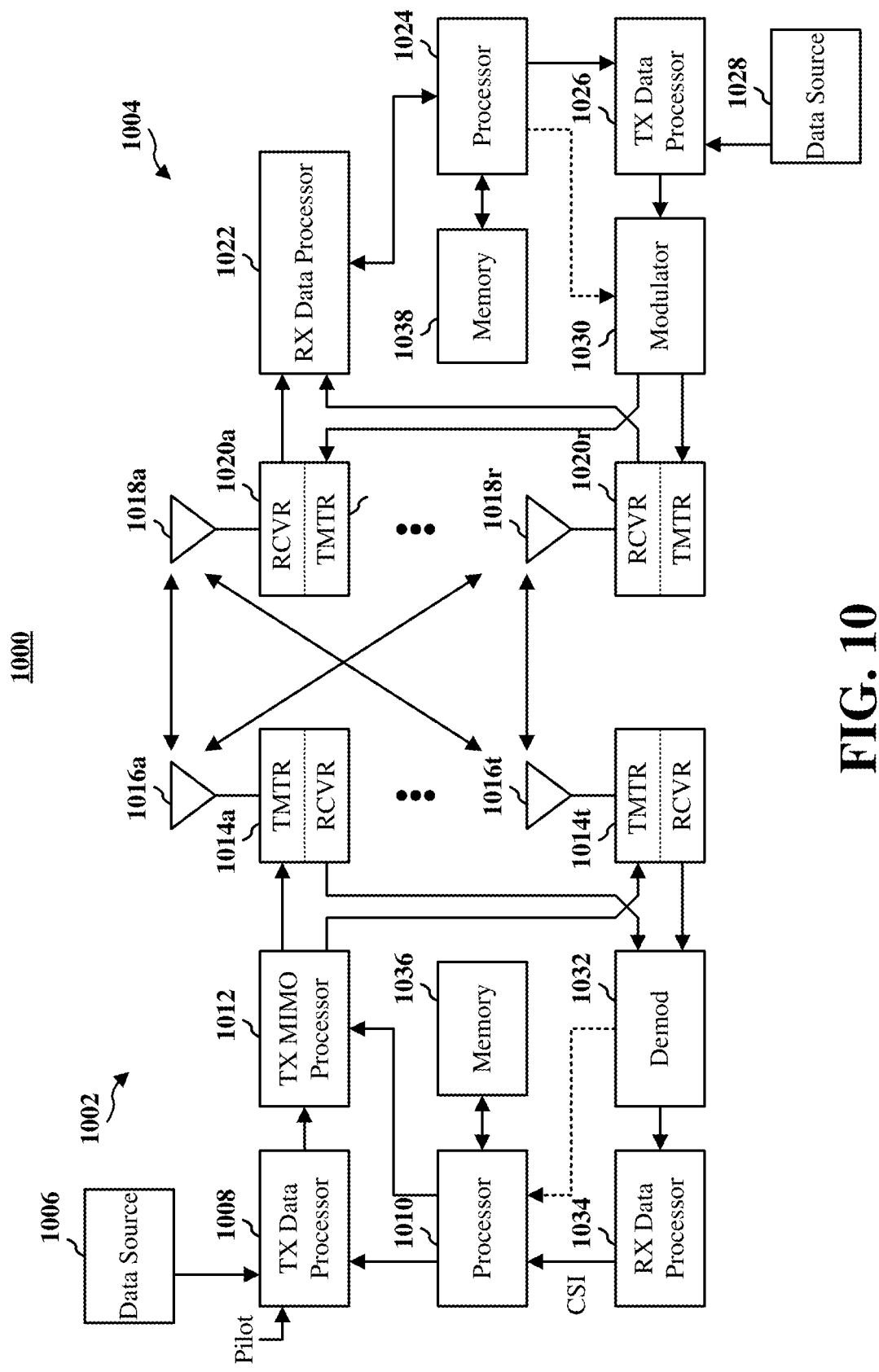
FIG. 10 illustrates a simplified block diagram of an embodiment of a wireless communications system that includes a transmitter system and a receiver system, in accordance with one or more embodiments described herein.

FIG. 10 illustrates a simplified block diagram of an embodiment a MIMO system 1000 that includes of a transmitter system 1002 (also known as the access network) and a receiver system 1004 (also known as user equipment (UE)) in accordance with one or more embodiments described herein. At the transmitter system 1002, traffic data for a number of data streams is provided from a data source 1006 to a transmit (TX) data processor 1008.

In one embodiment, each data stream is transmitted over a respective transmit antenna. TX data processor 1008 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 1010.

The modulation symbols for all data streams are then provided to a TX MIMO processor 1012, which may further process the modulation symbols (e.g., for OFDM). TX MIMO processor 1012 then provides $N_T$ modulation symbol streams to $N_T$ transmitters (TMTR) 1014a through 1014t. In certain embodiments, TX MIMO processor 1012 applies beamforming weights to the symbols of the data streams and to the antenna from which the symbol is being transmitted.

Each transmitter 1014 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1014a through 1014t are then transmitted from $N_T$ antennas 1016a through 1016t, respectively.

At receiver system 1004, the transmitted modulated signals are received by $N_R$ antennas 1018a through 1018r and the received signal from each antenna 1018 is provided to a respective receiver (RCVR) 1020a through 1020r. Each receiver 1020 conditions (e.g., filters, amplifies, and downconverts) a respective received signal, digitizes the conditioned signal to provide samples, and further processes the samples to provide a corresponding "received" symbol stream.

An RX data processor 1022 then receives and processes the $N_R$ received symbol streams from $N_R$ receivers 1020 based on a particular receiver processing technique to provide $N_T$ "detected" symbol streams. The RX data processor 1022 then demodulates, deinterleaves, and decodes each detected symbol stream to recover the traffic data for the data stream. The processing by RX data processor 1022 is complementary to that performed by TX MIMO processor 1012 and TX data processor 1008 at transmitter system 1002.

A processor 1024 periodically determines which pre-coding matrix to use. Processor 1024 formulates a reverse link message comprising a matrix index portion and a rank value portion.

The reverse link message may comprise various types of information regarding the communication link and/or the received data stream. The reverse link message is then processed by a TX data processor 1026, which also receives traffic data for a number of data streams from a data source 1028, modulated by a modulator 1030, conditioned by transmitters 1020a through 1020r, and transmitted back to transmitter system 1002.

At transmitter system 1002, the modulated signals from receiver system 1004 are received by antennas 1016, conditioned by receivers 1014, demodulated by a demodulator 1032, and processed by a RX data processor 1034 to extract the reverse link message transmitted by the receiver system 1004. Processor 1010 then determines which pre-coding matrix to use for determining the beamforming weights then processes the extracted message.

Memory 1036 can be used to temporarily store some buffered/computational data from 1032 or 1034 through processor 1010, store some buffered data from 1006, or store some specific program codes. Further, memory 1038 may be used to temporarily store some buffered/computational data from 1022 through processor 1024, store some buffered data from 1028, or store some specific program codes.

Figure 11:
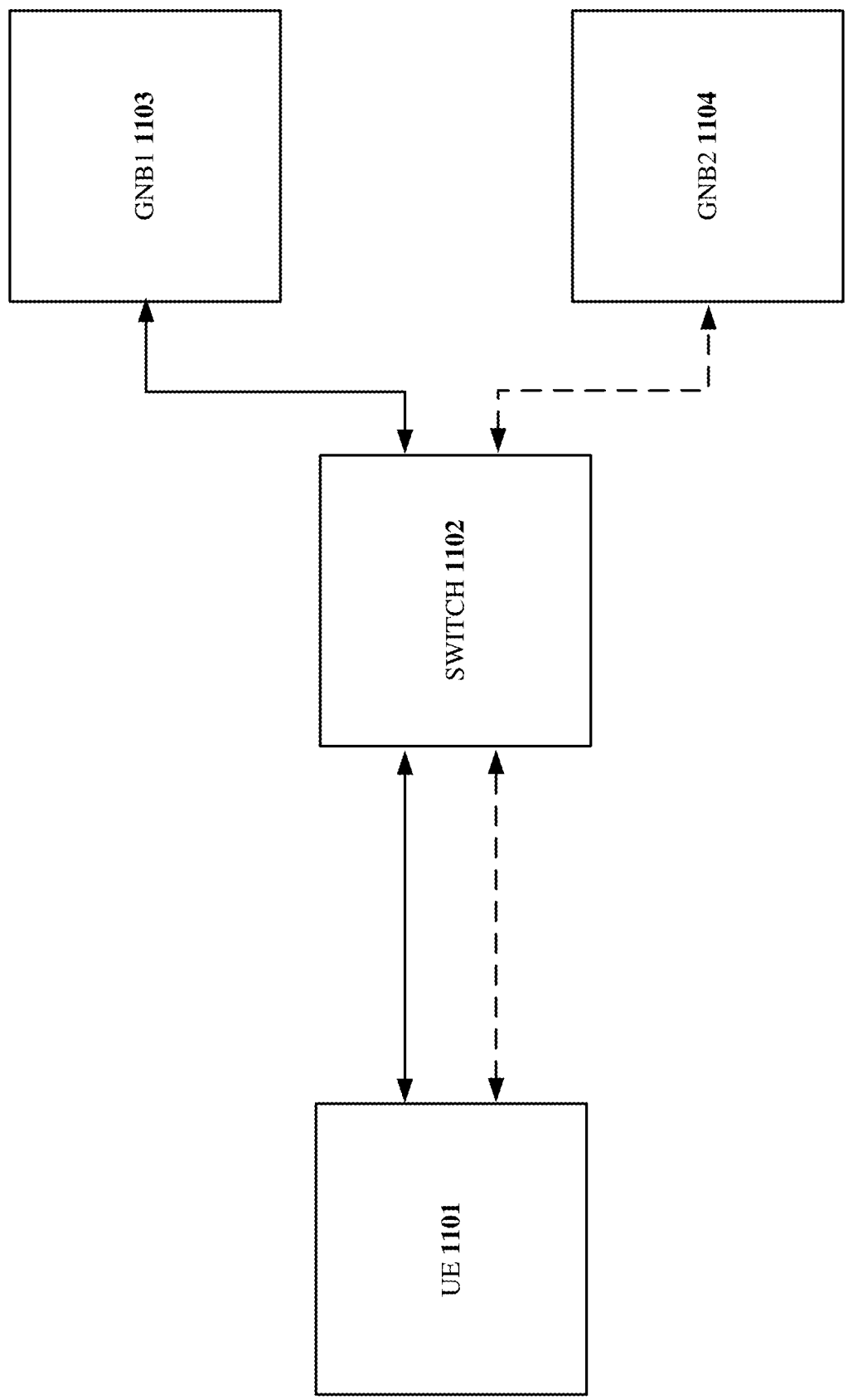
FIG. 11 illustrates an example, non-limiting communication system, in accordance with one or more embodiments described herein.

FIG. 11 illustrates an example, non-limiting wireless communication system in accordance with one or more embodiments described herein. UE 1101 communicates with gNB1 1103 through switch 1102. If gNB1 1103 supports broadcast or multicast, then UE 1101 will maintain its connection to gNB1 1103 through switch 1102. However, if gNB2 1104, and not gNB1 1103, supports broadcast or multicast, then switch 1102 will perform a handover operation to transfer the connection with UE 1101 from gNB1 1103 to gNB2 1104. It will be understood that switch 1102 may be a separate component, or incorporated into gNB1 1103. The switch 1102 can be implemented in hardware, software, firmware or by way of signaling. The switch can perform the handover operations illustrated in, for example, FIGS. 3, 4 and 5.

Figure 12:
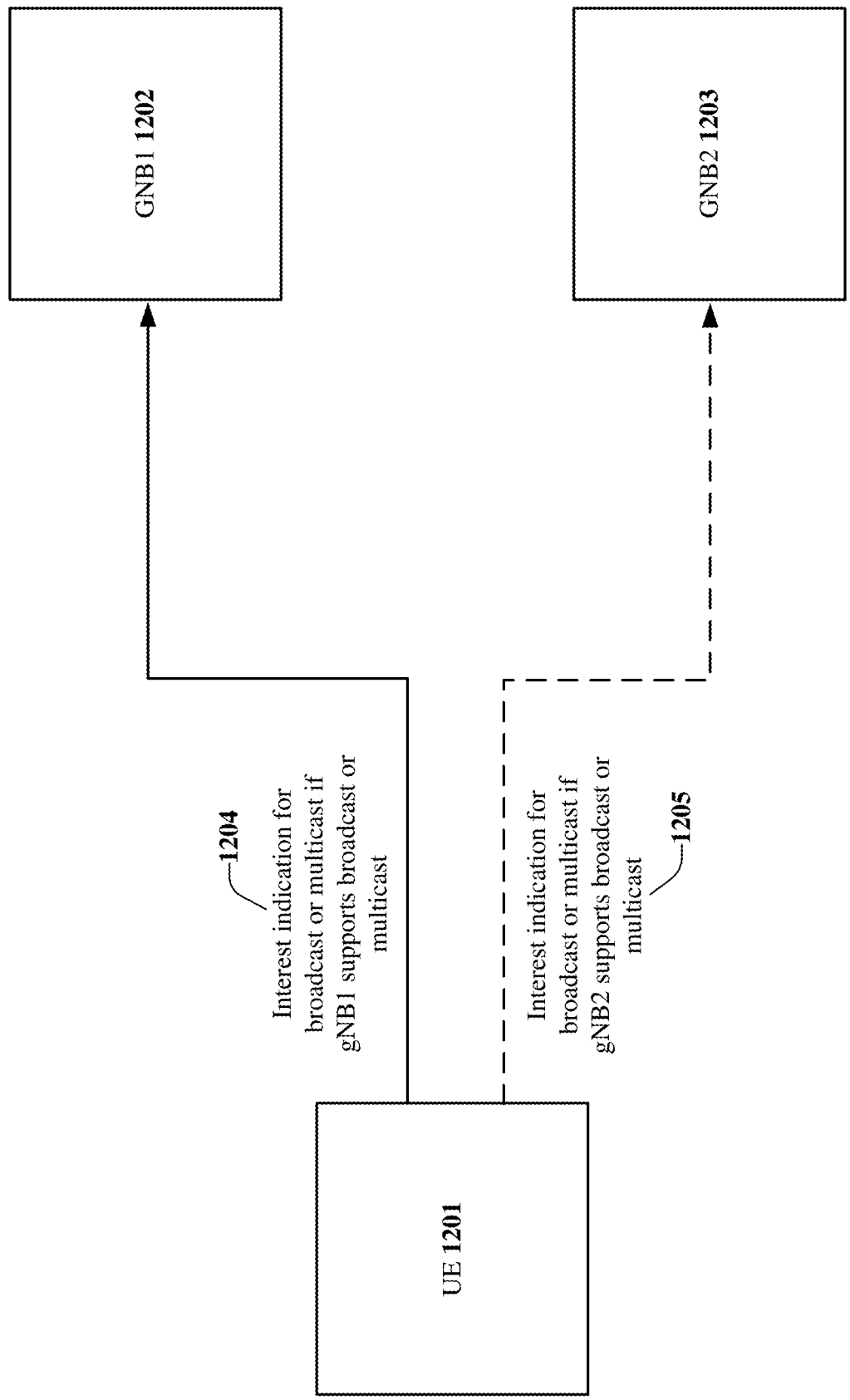
FIG. 12 illustrates another example, non-limiting communication system, in accordance with one or more embodiments described herein.

FIG. 12 illustrates an example, non-limiting wireless communication system in accordance with one or more embodiments described herein. As illustrated, UE 1201 is connected to gNB1 1202. UE 1201 will transmit interest indication for broadcast or multicast 1204 to gNB1 1202 if gNB1 1202 supports broadcast or multicast. However, if gNB1 1202 does not support broadcast or multicast, the connection with UE 1201 will be transferred to gNB2 1203 through a handover operation. UE 1201 will thereafter transmit interest indication for broadcast or multicast 1205 to gNB2 1203.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects, a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), Universal Mobile Telecommunications System (UMTS), Worldwide Interoperability for Microwave Access (WiMAX), enhanced General Packet Radio Service (enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk;

floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method for a user equipment (UE), comprising:
   determining by the UE whether a serving cell supports broadcast or multicast service, wherein a system information block (SIB), including one or multiple broadcast multicast service area identities, is not broadcasted in the serving cell prior to the UE providing an interest indication for broadcast or multicast service; and
   transmitting in the serving cell by the UE the interest indication for broadcast or multicast service if the serving cell supports broadcast or multicast service, wherein the interest indication by the UE includes at least an identity of a particular broadcast or multicast service of interest, and wherein the UE does not have the SB prior to transmitting the interest indication for broadcast or multicast service,
   wherein the interest indication for broadcast or multicast service indicates whether the UE has the SIB.

2. The method of claim 1, wherein the UE is in RRC_CONNECTED when the UE transmits the interest indication for broadcast or multicast.

3. The method of claim 1, wherein the UE determines whether the serving cell supports broadcast or multicast service based on content of a periodic message broadcasted by the serving cell.

4. The method of claim 1, further comprising: receiving the SIB after transmitting the interest indication for broadcast or multicast, if the interest indication for broadcast or multicast indicates the UE does not have the SIB.

5. The method of claim 1, further comprising: receiving a message after transmitting the interest indication for broadcast or multicast, wherein the message indicates the serving cell does not provide the broadcast or multicast service of interest.

6. The method of claim 1, further comprising: transmitting a request for the SIB, instead of the interest indication for broadcast or multicast, in the serving cell if the UE does not have the SIB and if the serving cell supports broadcast or multicast service, wherein the UE is not in RRC_CONNECTED.

7. A user equipment (UE) comprising:
   a control circuit;
   a processor installed in the control circuit;
   a memory installed in the control circuit and operatively coupled to the processor;
   wherein the processor is configured to execute a program code stored in the memory to perform steps comprising:
      determining whether a serving cell supports broadcast or multicast service,
   wherein a system information block (SIB), including one or multiple broadcast or multicast service area identities, is not broadcasted in the serving cell prior to the UE providing an interest indication for broadcast or multicast service; and
      transmitting in the serving cell the interest indication for broadcast or multicast service if the serving cell supports broadcast or multicast service, wherein the interest indication includes at least an identity of a particular broadcast or multicast service of interest, and wherein the UE does not have the SIB prior to transmitting the interest indication for broadcast or multicast service,
      wherein the interest indication for broadcast or multicast service indicates whether the UE has the SIB.

8. The UE of claim 7, wherein the UE is in RRC_CONNECTED when the UE transmits the interest indication for broadcast or multicast.

9. The UE of claim 7, wherein the UE determines whether the serving cell supports broadcast or multicast service based on content of a periodic message broadcasted by the serving cell.

10. The UE of claim 7, wherein the processor is configured to execute a program code stored in the memory to perform steps further comprising: receiving the SIB after transmitting the interest indication for broadcast or multicast, if the interest indication for broadcast or multicast indicates the UE does not have the SIB.

11. The UE of claim 7, wherein the processor is configured to execute a program code stored in the memory to perform steps further comprising: receiving a message after transmitting the interest indication for broadcast or multicast, wherein the message indicates the serving cell does not provide the broadcast or multicast service of interest.

12. The UE of claim 7, wherein the processor is configured to execute a program code stored in the memory to perform steps further comprising:
   transmitting a request for the SIB, instead of the interest indication for broadcast or multicast, in the serving cell if the UE does not have the SIB and if the serving cell supports broadcast or multicast service, wherein the UE is not in RRC_CONNECTED.

* * * * *